(12) United States Patent
Destrempes et al.

(10) Patent No.: US 8,600,128 B2
(45) Date of Patent: Dec. 3, 2013

(54) IMAGE SEGMENTATION

(75) Inventors: François Destrempes, Montréal (CA);
Guy Cloutier, Repentigny (CA); Jean Meunier, Outremont (CA)

(73) Assignees: Centre Hospitalier de l'Université de Montréal, Montréal (CA); Université de Montréal, Montréal (CA)

( * ) Notice: Subject to any disclaimer, the term of this patent is extended or adjusted under 35 U.S.C. 154(b) by 1107 days.

(21) Appl. No.: 12/558,786

(22) Filed: Sep. 14, 2009

(65) Prior Publication Data

US 2010/0081931 A1    Apr. 1, 2010

Related U.S. Application Data

(63) Continuation of application No. PCT/CA2008/000501, filed on Mar. 14, 2008.

(60) Provisional application No. 60/918,044, filed on Mar. 15, 2007.

(51) Int. Cl.
*G06K 9/00* (2006.01)

(52) U.S. Cl.
USPC .......................................................... 382/128

(58) Field of Classification Search
None
See application file for complete search history.

(56) References Cited

U.S. PATENT DOCUMENTS

| 8,218,869 | B2 * | 7/2012 | Porikli et al. ................ | 382/173 |
| 8,313,437 | B1 * | 11/2012 | Suri .............................. | 600/443 |
| 8,411,952 | B2 * | 4/2013 | Chefd'hotel et al. ......... | 382/180 |
| 2007/0047788 | A1 | 3/2007 | Slablaugh et al. | |
| 2010/0014756 | A1 * | 1/2010 | Kato et al. .................... | 382/173 |
| 2010/0098343 | A1 * | 4/2010 | Perronnin et al. ............ | 382/224 |

FOREIGN PATENT DOCUMENTS

WO        WO01/89386        11/2001

OTHER PUBLICATIONS

International Search Report, PCT/CA2008/000501, May 28, 2008.
Escobar, M., "Estimating Normal Means with a Dirichlet Process Prior", Journal of the American Statistical Association, vol. 89, No. 425, pp. 268-277, 1993.
Dempster et al., "Maximum Likelihood from Incomplete Data via the EM Algorithm" Journal of the Royal Statistical Society (ser. B), vol. 39, pp. 1-38, 1977.

(Continued)

*Primary Examiner* — Samir Ahmed
(74) *Attorney, Agent, or Firm* — Norton Rose Fulbright Canada LLP

(57) ABSTRACT

A method for segmenting an image comprising: determining an initial estimation of a boundary between at least two components in a region of an image to be segmented; providing image data from the region of the image to be segmented, the image data representing gray level values of a plurality of image elements of the components; modelling the image data on a mixture of at least two statistical distributions, each statistical distribution having more than one parameter, and each component being associated with certain weights of the statistical distributions in the mixture; estimating the parameters of the statistical distributions in the mixture; for each component, estimating the weights of the statistical distributions in the mixture based on the estimated parameters and the image data of each image element; and optimizing the initial estimation of the boundary between the components based on the estimated parameters and estimated weights.

20 Claims, 11 Drawing Sheets

(56) References Cited

OTHER PUBLICATIONS

Meinders et al., "Assessment of Spatial Inhomogeneities in Intima Media Thickness Along an Arterial Segment Using its Dynamic Behavior", Am. J. of Physiology—Heart and Circulatory Physiology, vol. 285, pp. H384-H391, 2003.
François O., "Global Optimisation with Exploration/Selection Algorithms and Simulated Annealing" The Annals of Applied Probability, vol. 12, No. 1, pp. 248-271, 2002.
Destrempes et al., "Fusion of Hidden Markov Random Field Models and its Bayesian Estimation" IEEE Transaction on Image Processing, vol. 15, No. 10, pp. 2920-2935, 2006.
Destrempes et al., "Localisation of Shapes using Statistical Models and Stochastic Optimization", IEEE Transactions on Pattern Analysis and Machine Intelligence vol. 29, No. 9, pp. 1603-1615, 2007.
J. Besag, "Statistical Analysis of Non-Lattice Data", The Statistician, vol. 24(3), pp. 179-195, 1975.
Friedland et al. "Automatic Ventricular Cavity Boundary Detection from Sequential Ultrasound Images using Simulated Annealing", IEEE Transaction on Medical Images, vol. 8, No. 4, pp. 344-353, 1989.
François O., "An Evolutionary Strategy for Global Minimization and Its Markov Chain Analysis", IEEE Transactions on Evolutionary Computation, vol. 2, No. 3, pp. 77-90, 1998.
J. Besag, "On the Statistical Analysis of Dirty Pictures", J. R. Statist. Soc. B, vol. 48, No. 3, pp. 259-302, 1986.
Dias et al, "Wall Postion and Thickness Estimation from Sequences of Echocardiographic Images", IEEE Transaction on Medical Images, vol. 15, No. 1, pp. 25-38, 1996.
Mignotte et al. "Endocardial Boundary Estimation and Tracking in Endocardiographis Image using Deformable Templates and Markov Random Fields", Pattern Analysis and Applications, vol. 4, pp. 256-271, 2001.
Mikic I. et al., "Segmentation and Tracking in Echocardiographic Sequences: Active Contours Guided by Optical Flow Estimates", IEEE Transaction on Medical Images, vol. 17, No. 2, pp. 274-284, 1998.

* cited by examiner

 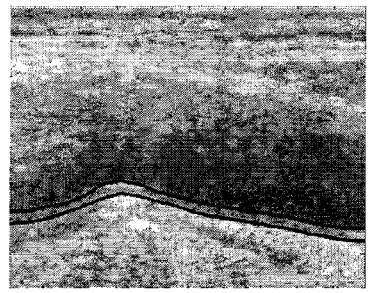
FIG.8A  FIG.8B
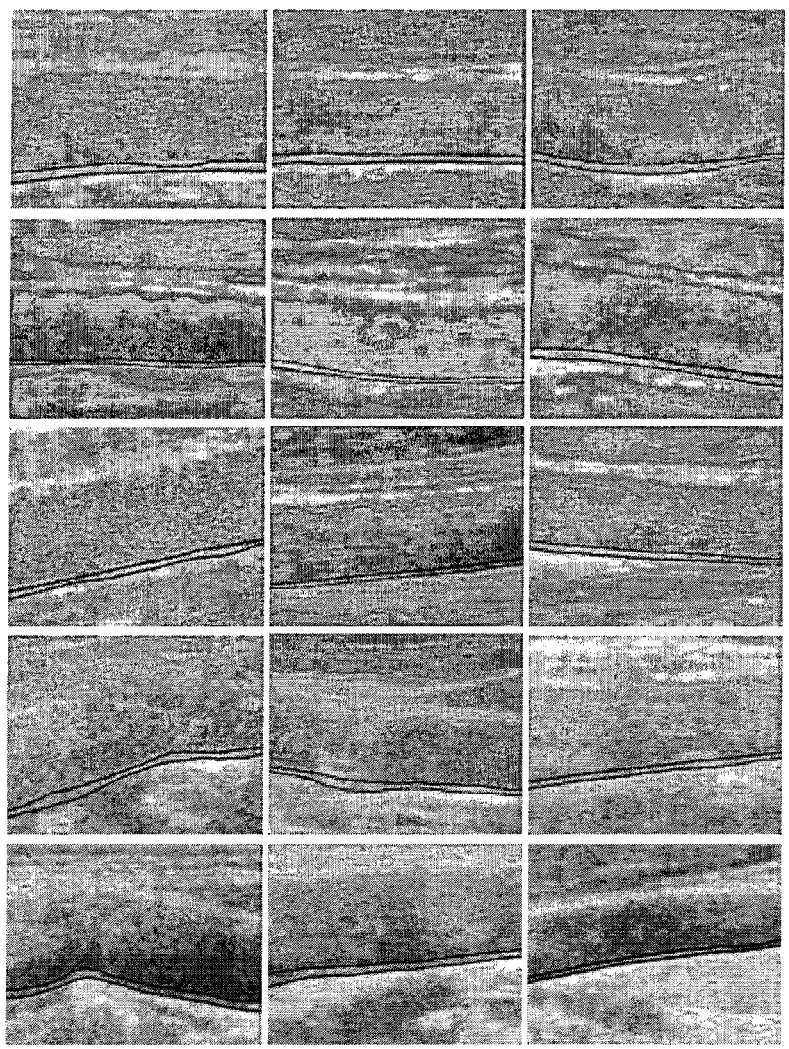
FIG.9

R          FIG. 11

IMAGE SEGMENTATION

CROSS-REFERENCE TO RELATED APPLICATIONS

This application is a continuation of International Patent Application No. PCT/CA2008/000501 filed on Mar. 14, 2008 designating the United States of America, which PCT Application claims benefit of U.S. Provisional Patent Application No. 60/918,044 filed on Mar. 15, 2007, all of which are herein incorporated by reference.

FIELD OF THE INVENTION

The present invention generally relates to image segmentation. More specifically, although not exclusively, the present invention generally relates to a semi-automated method and system of image segmentation.

BACKGROUND OF THE INVENTION

Image segmentation is typically used to process or modify images to locate objects and boundaries between structures in the images. Thus, segmentation can modify the representation of an image into another representation that is more meaningful and easier to analyze. For example, segmentation of an image can result in the partitioning of the image into multiple regions which can enable the definition of boundaries and the location of objects in images. For digital images having pixels, segmentation can be achieved by similarly characterizing each of the pixels in a region with respect to pixel qualities such as gray levels, colour, texture, etc. Segmentation of sequences of images can also be a useful tool for tracking the position, size and shape of objects as a function of time.

One application of image segmentation is in ultrasound imaging. Ultrasound imaging techniques are commonly used as non-invasive and non-destructive detection and diagnostic tools in a range of industries including medicine, foodstuffs, pharmaceuticals, petrochemicals, chemicals and materials processing. Known techniques take advantage of quantitative ultrasonic parameters such as scattering, backscattering, attenuation, speed of sound, tissue/material nonlinearity and statistics to reveal intrinsic tissue and material properties such as microstructure and composition. The ultrasound image is characterized by pixels of differing intensities that may be used to differentiate different regions of interest. In the case of ultrasound imaging of biological tissues, microstructure and lesions or other abnormalities in the tissue can be detected. Some tissue types can be subjectively identified by their texture. This method has been used successfully to detect or diagnose many medical conditions including atherosclerotic vascular disease, tumors in soft tissue such as the breast and prostate, early Duchenne muscular dystrophy, to monitor cell apoptosis, and to characterize carcinomas, to name a few examples.

Diagnosis from ultrasound images may be hampered by the quality of the images and the nature of the structures being imaged. For example, ultrasound images of soft tissue structures may be low contrast and their often irregularly shaped boundaries further masked by speckle noise, imaging artifacts and shadowing by calcifications in parts of the structures. One such clinical application is in identifying atherosclerotic plaque structures within a vascular wall as the layers of the vascular wall have low contrast and the plaque structures have irregularly shaped boundaries.

Furthermore, the images being analyzed may describe time-varying dynamic structures which can be assessed from a sequence of images in an ultrasound video or a digital Cine loop of an anatomical area. Therefore, for proper diagnosis, a large number of images must be reviewed. If performed manually, this is a time consuming task and subject to variability between observers and subjective interpretation.

Therefore, there is a need for an improved image segmentation method and system.

SUMMARY OF THE INVENTION

An object of the present invention is to provide an improved method and system for image segmentation.

According to one aspect, there is provided a method for segmenting an image, the method comprising: determining an initial estimation of a boundary between at least two components in a region of an image to be segmented; providing image data from the region of the image to be segmented, the image data representing quality level values of a plurality of image elements of the at least two components; modelling the image data with a mixture of at least two statistical distributions, each statistical distribution having more than one parameter, and each component being associated with certain weights of the at least two statistical distributions in the mixture; estimating the parameters of the statistical distributions in the mixture; for each component, estimating the weights of the at least two statistical distributions in the mixture based on the estimated parameters and the image data of each image element; and optimizing the initial estimation of the boundary between the at least two components based on the estimated parameters and estimated weights.

Advantageously, by means of the invention, the method can be semi-automated with the only required manual input being the initial estimation of the boundary. This means that a large number of images can be segmented more quickly compared to manual segmentation methods due to the minimal observer or input. Also, the risk of incorrect and inaccurate image segmentation due to observer subjectivity and inter-observer variability is reduced. Therefore, the present image segmentation method can provide a cheaper, quicker and more efficient and consistent segmentation of images.

The method can be applied to a sequence of images having at least a first frame and a second frame. In this case, the method can further comprise propagating the optimized boundary of the first frame to a second image which is a second frame of the sequence of images to form an initial boundary estimation in the second frame, and optimizing, at least semi-automatically, the initial boundary estimation in the second frame. In this way, the size, shape and location of the boundary of the components can be tracked in the sequence of images, for example as a function of time. Propagating the optimized boundary of the first frame can comprise repeating the optimized boundary in the second frame or basing its propagation on a prediction based on a motion estimation. The method can include propagating the optimized boundary of one frame to a subsequent frame.

In one embodiment, the method comprises manually determining an initial estimation of a boundary between at least two components in a region of an image to be segmented; providing image data from the region of the image to be segmented, the image data representing quality level values of a plurality of image elements of the at least two components; modelling the image data with a mixture of at least two statistical distributions, each statistical distribution having more than one parameter, and each component being associated with certain weights of the at least two statistical distributions in the mixture; estimating the parameters of the statistical distributions in the mixture; for each component, estimating the weights of the at least two statistical distributions in the mixture based on the estimated parameters and the image data of each image element; optimizing the initial estimation of the boundary between the at least two components based on the estimated parameters and estimated weights; and propagating the optimized boundary in the first image to a second image in a sequence of images of the at least two components, and using the propagated boundary as an initial boundary estimation in the second image to at least semi-automatically estimate the boundary in the second image from the initial manual estimation in the first image.

By image, it is meant any type of image having image elements, such as pixels, each image element having a quality level value which can be any property or quality of the image element such as its gray level (intensity or brightness) or colour or texture to allow segmentation. The images can be ultrasound images or optical images for example.

By boundary, it is meant any feature or aspect of an image which is to be differentiated from or highlighted over any other feature or aspect of the image. For example, the boundary can be a part of a single component or one component of a multi-component body. The boundary may define the circumference or any other part of a body which may be a discrete body. For example, the at least two components can be part of a biological material such as a blood vessel and the components may comprise a plaque formation (i.e. an atherosclerotic plaque formation) on a wall of the blood vessel or layers of the blood vessel wall. One use of the method, therefore, can be for predicting risk of vascular aneurysm.

The image can be an ultrasound image, such as a B-mode ultrasound image (B-mode for brightness), and the image data digitized B-mode image data. Alternatively, the ultrasound image can be a RF ultrasound image and the image data RF image data. In this case, the method can comprise converting the RF image data to B-mode data.

Alternatively, the ultrasound image can be a M-mode ultrasound image and the image data is digitized M-mode image data, a Doppler-mode ultrasound image and the image data is digitized Doppler-mode image data, a harmonic-mode ultrasound image and the image data is digitized harmonic-mode image data, a tissue characterization-mode ultrasound image and the image data is digitized tissue characterization-mode image data or a RF-mode ultrasound image and the image data is digitized RF-mode image data. These can be obtained by converting the raw RF image data.

The present method has advantages over known ultrasound image segmentation methods in that image data can be modelled more accurately and the statistical distribution parameters estimated more readily. The present method is particularly advantageous when applied to the segmentation of ultrasound images of biological tissue. There are disadvantages associated with known modelling methods of ultrasonic scattering of tissues described by B-mode images using statistical parameters. Rayleigh distributions have been used to model local gray level i.e. brightness, of a speckle pattern in a B-mode ultrasound image. However, Rayleigh distributions are relevant for modelling an image of an area comprising a high density of independent random scatterers only. This is often not relevant to anatomical structures in many clinical applications which comprise non-uniform scattering tissues with some levels of coherence. Rician distributions have been used to model unresolved coherent components, i.e. scatterers with spacing smaller than the speckle size, the speckle size depending on the size of individual scatterers and the ultrasound wavelength. Generalized Rician distributions have been used to model the local intensity of resolved coherent components, i.e. with spacing larger than the speckle size. Pre-Rician K-distribution has been used to model a few diffuse scatterers. However, except for Rayleigh distributions, none of these models can be easily estimated mathematically which is a limitation for semi-automated image segmentation. The present method overcomes these disadvantages, and is applicable to the segmentation of images other than ultrasound images for a large variety of applications.

The mixture of the at least two statistical distributions can be a mixture of Nakagami distributions, each Nakagami distribution having two parameters, and the color level values of the image elements being brightness gray levels; or a mixture of Gamma distributions, each Gamma distribution having two parameters and the color level values of the image elements being intensity gray levels. Any other suitable statistical distribution can also be used.

Preferably, estimating the parameters of the at least two statistical distributions is based on a parameter estimation algorithm such as an Expectation-Maximization (EM) algorithm, and optimizing the initial estimation of the boundary is based on an optimization algorithm such as an Exploration/Selection (ES) algorithm. Other algorithms can also be used.

Advantageously, the method can further comprise determining the region of the image to be segmented from the initial estimation of the boundary.

In one embodiment, determining the initial estimation of the boundary comprises manually selecting a plurality of discrete points, and determining the region comprises determining a curve of best fit for the manually selected plurality of discrete points, and transposing the curve of best fit by a first predetermined distance in one direction to form a first border of the region and by transposing the curve by a second predetermined distance in another direction to form a second border of the region. The weights of the at least two statistical distributions in the mixture for each component can be estimated based on a predetermined quality level ranking between the at least two distributions (e.g. color or gray scale ranking). Alternatively, the initial estimation may also be performed automatically, for example using predetermined quality level values (e.g. color or gray level values).

In another embodiment, determining the initial estimation of the boundary comprises manually tracing the boundary to form the initial boundary, and determining the region comprises transposing the initial boundary by a first predetermined distance in one direction to form a first border of the region and by transposing the initial boundary by a second predetermined distance in another direction to form a second border of the region. The weights of the at least two distributions in the mixture for each component can be estimated based on the traced boundary, using an EM estimation algorithm, for example. By manually tracing, it is meant determining a initial boundary by selecting a plurality of pixels which estimate the boundary. Alternatively, the initial estimation may also be performed automatically, for example using predetermined quality level values (e.g. color or gray scale values).

Optionally, the method can include defining non-overlapping sub-regions of the region and smoothing the at least two statistical distributions between each sub-region. Smoothing the at least two statistical distributions between each sub-region can comprise modelling the image data from each sub-region by a Bayesian model average of the mixture of the at least two statistical distributions corresponding to the at least two sub-regions.

From a further aspect, there is provided a computer readable memory having recorded thereon statements and instructions for execution by a computer to carry out a method of image segmentation as described above.

According to yet another aspect, there is provided a system for segmenting an image, the system comprising: a display for displaying an image of at least two components having a boundary to be estimated; a digitizer in communication with the display for providing image data of a region of the image to be segmented based on an initial estimation of the boundary, the image data representing quality level values of a plurality of image elements of the at least two components; and a processor in communication with the digitizer for modelling the image data with a mixture of at least two statistical distributions, each statistical distribution having more than one parameter, and each component being associated with certain weights of the at least two statistical distributions in the mixture; estimating the parameters of the statistical distributions in the mixture; for each component, estimating the weights of the at least two statistical distributions in the mixture based on the estimated parameters and the image data of each image element; and optimizing the initial estimation of the boundary between the at least two components based on the estimated parameters and estimated weights.

The display can display the optimized boundary on the image. The system can further comprise an input device for manually estimating the boundary on the image. Optionally, the system may include a storage device for storing the image data or for storing the optimized boundary estimation. The image can be an ultrasound image and the quality level values gray scale or color scale values, and the system can further comprise an ultrasound system for generating the ultrasound image, such as an ultrasound signal generator, transducer, receiver and signal generator.

BRIEF DESCRIPTION OF THE DRAWINGS

Further aspects and advantages of the present invention will become better understood with reference to the description in association with the following in which:

FIGS. 8A and 8B are two examples of segmented ultrasound images showing the segmentation of the intima-media layer of the far wall of a common carotid artery obtained by the first embodiment of the method of FIG. 2;

FIG. 9 illustrates segmentation of the first frame of 15 time-sequences of ultrasound images of different common carotid arteries according to Example 1 of the first embodiment of the method of FIG. 2;

DETAILED DESCRIPTION OF THE INVENTION

Aspects of the present invention generally relate to a system and a method for image segmentation. The illustrative embodiments of each aspect described below relate to an estimation of a boundary between two bodies in an image of the two bodies, or two features of a single body. Specifically, the embodiments relate to the segmentation of an ultrasound image of a portion of a carotid artery. The image may be part of a sequence of ultrasound images at different time points. However, it will be appreciated that the present invention may equally be applied to the segmentation of non-ultrasound images e.g. optical images, of other bodies, or components of a multi-component body which may be anatomical or non-anatomical.

A system 10 for segmenting an image comprises a display for displaying an image of at least two components having a boundary to be estimated; a digitizer in communication with the display for providing image data of a region of the image to be segmented based on an initial estimation of the boundary, the image data representing color level values of a plurality of image elements of the at least two components; and a processor in communication with the digitizer for modelling the image data with a mixture of at least two statistical distributions, each statistical distribution having more than one parameter, and each component being associated with certain weights of the at least two statistical distributions in the mixture; estimating the parameters of the statistical distributions in the mixture; for each component, estimating the weights of the at least two statistical distributions in the mixture based on the estimated parameters and the image data of each image element; and optimizing the initial estimation of the boundary between the at least two components based on the estimated parameters and estimated weights.

Figure 1:
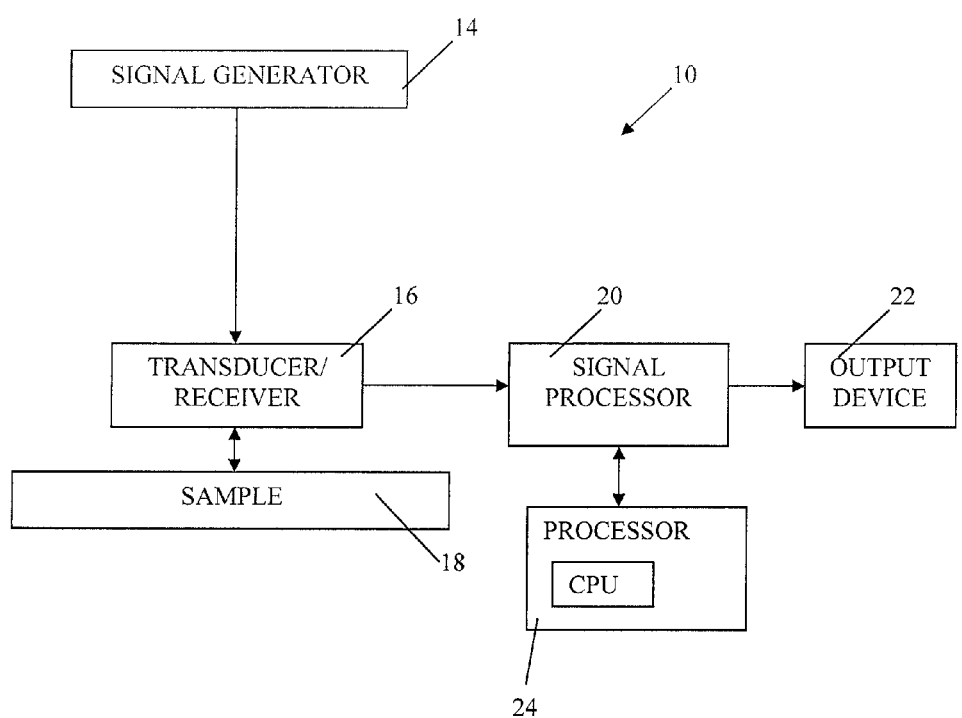
FIG. 1 is a block diagram illustrating a system for image segmentation according to an embodiment of a first aspect of the present invention.

An overview of an embodiment of the system 10 in which an embodiment of the method of the invention can be encompassed is illustrated in FIG. 1. The system 10 of this embodiment comprises an ultrasound system as is known in the art which typically comprises a signal generator 14 or pulser that generates an electrical signal which is transmitted to a transducer 16. The transducer 16 converts the electric signal into an acoustic input signal that is introduced into a sample 18, which in this embodiment is a region of a carotid artery of a patient, by positioning the transducer 16 on the skin of a patient over the region of interest The same transducer 16, or optionally a separate transducer (not shown), acts as a sensor to sense a portion of the acoustic energy that is scattered by structures in the artery in response to their interaction with the acoustic input signal and provide an output signal to a signal processor 20. In the case of two transducers, one transducer transmits echoes and the other receives echoes and transmits the output signal to the signal processor 20. The signal processor 20 processes the output signal to provide an output, such as an ultrasound image of the artery, to an output device 22, or image data.

In the present embodiment, the signal generator 14, the transducer/receiver 16 and the signal processor 20 are part of a single ultrasound device, such as a Sonix RP ultrasound scanner (Ultrasonix, Vancouver, Canada) with a 10 MHz 38 mm linear array transducer. The frame rate can depend on the video sequence, and in this embodiment is around 19 Hz. In the axial direction, 1 mm corresponds to 51.9 pixels whereas in the lateral direction, 1 mm is equal to about 6.7 pixels (i.e. 256 scan lines for 38 mm). Any other type of suitable signal generator, transducer/receiver or signal processor may be used to provide an ultrasound image, a sequence of ultrasound images or ultrasound image data and the present invention is not limited to this specific embodiment of ultrasound data acquisition.

Figure 2:
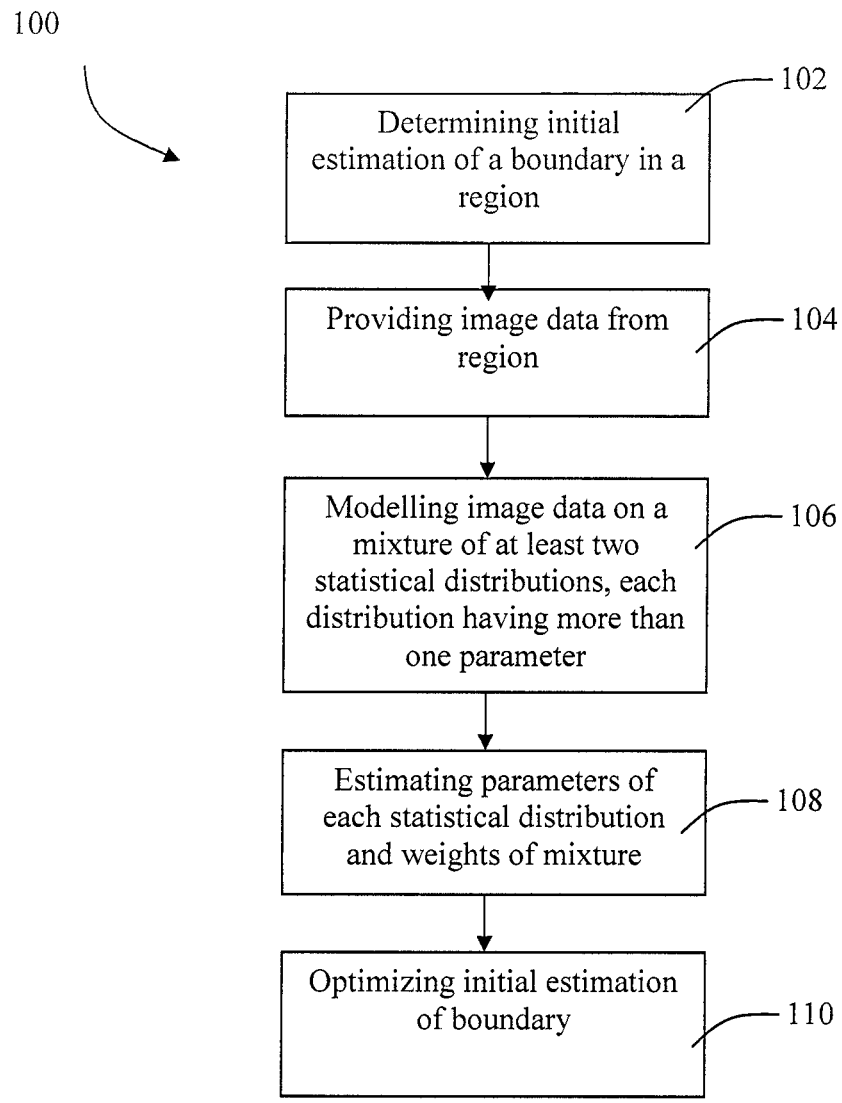
FIG. 2 is a flowchart illustrating a method for image segmentation according to a second aspect of the present invention.
Figure 3A:
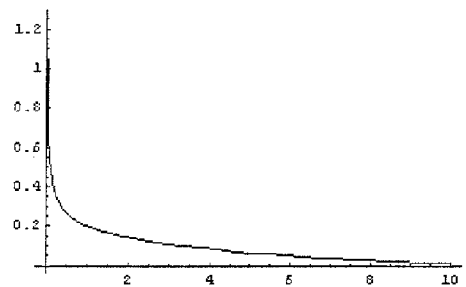
FIG. 3A-FIG. 3E illustrate Nakagami distributions when (A) $0<m<½$ (pre-Rician distribution), (B) $m=½$ (generalized Rician distribution); (C) $½<m<1$ (generalized Rician distribution), (D) $m=1$ (Rayleigh distribution), and (E) $m>1$ (Rician distribution)
Figure 3B:
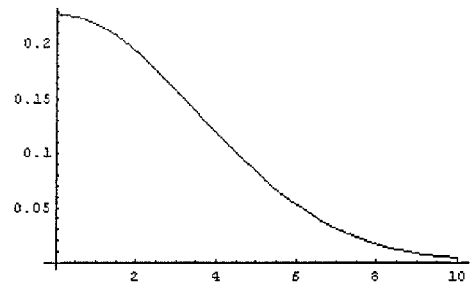
Figure 3C:
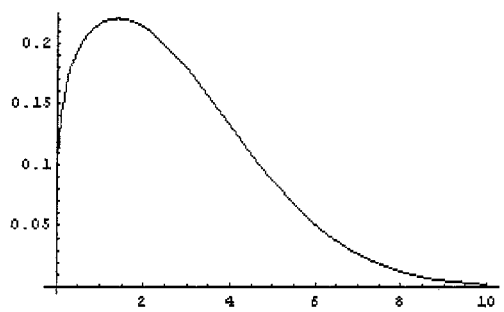
Figure 3D:
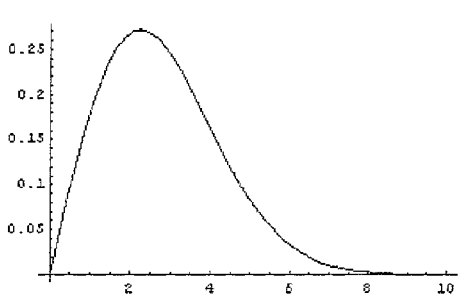
Figure 3E:
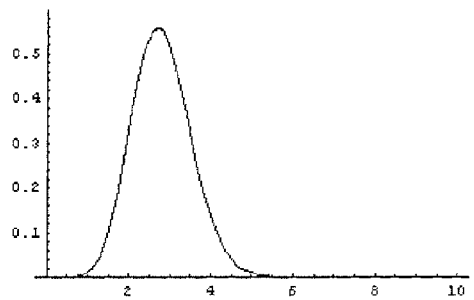

A processor 24 is provided in communication with the signal processor 20. The processor 24 is arranged to implement a method 100 for segmenting the ultrasound image, as will be described further below. The processor 24 is in the form of a personal computer including a central processing unit (CPU). Coupled to the processor 24 are input devices (not shown) such as a keyboard and a pointing device such as a mouse. The processor 24 may also include an output device (not shown) such as a display for displaying the segmented image. Alternatively, the segmented image may be displayed on the output device 22. The processor 24 may also be provided with a memory. The processor 24, the signal processor 20 and the output device 22 may be part of a single ultrasound image segmentation device, or be part of the ultrasound device. For example, the processor may be a dedicated computer board in an ultrasound scanner An overview of an embodiment of the method 100 of the present invention, is illustrated in FIG. 2. This first embodiment is concerned with segmenting an intima-media layer from other components of a carotid artery which typically comprises a lumen which is defined by the intima-media layer, and an outermost adventitia layer adjacent to the intima-media layer. The thickness of the intima-media layer, typically called the intima-media thickness (IMT), can provide an indication of early atherosclerosis. Typically, the IMT appears as a double-line pattern on both walls of a typical carotid artery when the artery is viewed longitudinally in ultrasound. The double-line pattern of the IMT is formed by the lumen-intima interface and the media-adventitia interface. The segmentation of the intima-media thickness of carotid arteries in ultrasound images can also be useful as a pre-processing step for computing various dynamical properties of that anatomical region, such as elastograms which are mappings of the mechanical properties of the artery wall.

The method 100 starts with a first step 102 of determining an initial estimation of the intima-media layer in a region of the ultrasound image to be segmented. In a second step 104, image data is provided from the region of the image to be segmented, the image data representing gray level values of a plurality of image elements of the components in the region. In this embodiment, the components are the various components of the carotid artery, namely the lumen, the intima-media layer, and the adventita layer. In a third step 106, the image data is modelled with a mixture of at least two statistical distributions, each statistical distribution having more than one parameter, and each component being associated with certain weights of the statistical distributions in the mixture, i.e. a non-negative weighted sum of the distributions with the weights adding up to one (1) ("a weighted mixture").

In a fourth step 108, the parameters of the statistical distributions in the mixture are estimated, and for each component the weights of each of the at least two statistical distributions in the mixture is estimated based on the estimated parameters and the image data of each image element. In a fifth step 110, the initial estimation of the boundary between the at least two components is optimized based on the estimated parameters and estimated weights.

It will be appreciated that the method may be performed on an ultrasound image or on ultrasound image data. In the present embodiment, a sequence of radio frequency (RF) ultrasound images is obtained and transformed to a sequence of B-mode ultrasound images. The method 100 of this embodiment is then performed on brightness data of a sample of pixels taken from one frame of the sequence of B-mode ultrasound images. It will be appreciated that the method is also applicable to M-mode, Doppler modes, harmonic modes, tissue characterization modes or any other ultrasound mode providing ultrasound images with color level values (typically gray levels). However, as stated earlier, the method of the invention is not limited to ultrasound images.

Specifically, Nakagami statistical distributions are used to model the brightness of the RF envelope of the artery region to be segmented. The parameters of the proposed model are estimated using an estimator algorithm such as an Expectation-Maximization (EM) algorithm. Although there is no closed form to update parameters in an M-step of the EM algorithm in the case of mixtures of Nakagami distributions, an iterative method is used. Optionally, to take into account the heterogeneity of echogenicities in B-mode ultrasound images, the distributions are estimated locally on non-overlapping windows of region R. Then, at each pixel, the two distributions corresponding to the two closest adjacent (non-overlapping) windows to that pixel are averaged in proportions corresponding to the distance from that pixel to each window, to insure a smooth transition from one window to the next one. The proposed distributions are used to model the likelihood of a Bayesian, or similar, model. The prior of the model is based on a geometric constraint for rectilinear curves, an anatomical prior of the IMT based on that for typical healthy patients, and a temporal constraint on the difference in the wall position between two subsequent frames. The solution sought is then formulated as the Maximum A Posteriori (MAP) of the Bayesian model. The MAP is computed using an optimization algorithm such as a stochastic optimization algorithm called the Exploration/Selection (ES) algorithm.

The development of this embodiment of the method is as follows. The Nakagami distribution is defined by $$N(r \mid m, \Omega) = \frac{2m^m r^{2m-1}}{\Gamma(m)\Omega^m} e^{-mr^2/\Omega}, \qquad (1)$$

for $r \geq 0$, where $\Gamma$ is the Euler gamma function. The real number $m>0$ is called the shape parameter, and $\Omega>0$ is called the scaling parameter. The gray level $r$ (also called local brightness) of the speckle pattern in a B-mode image reflects the local echogenicity of the underlying scatterers. When $m=1$, the Nakagami distribution is equivalent to a Rayleigh distribution $$\mathcal{R}(r \mid a) = \frac{r}{a^2} e^{-\frac{r^2}{2a^2}}$$

with $2a^2=\Omega$. When m>1, the Nakagami distribution becomes Rician; when ½≤m<1, the distribution is generalized Rician; and when 0<m<½, the distribution is pre-Rician. Nakagami distributions corresponding to various values of the shape parameter are illustrated in FIG. 3.

According to this embodiment of the present invention, the brightness in a region encompassing more than one body or component is modelled using a mixture of Nakagami distributions (MND), such as that characterized by:

$$f(r \mid p_1, \ldots m_1, \ldots, \Omega_1, \ldots) = \sum_{i=1}^{l} p_i N(r \mid m_i, \Omega_i), \quad (2)$$

where $p_i \geq 0$ and $$\sum_{i=1}^{l} p_i = 1$$

the number of kernels l is fixed.

With regard to the question of identifiability of the MND model, as known to those skilled in the art, given the equality $$f(r|p_1, \ldots, m_1, \ldots, \Omega_1, \ldots) = f(r|p'_1, \ldots, m'_1, \ldots, \Omega'_1, \ldots) \text{ for all } r \geq 0,$$

one can conclude that $p_i=p'_i$, $m_i=m'_i$ and $\Omega_i=\Omega'_i$ up to permutation of the kernels as follows from the known case of mixtures of gamma distributions. Indeed, a variable r follows a Nakagami distribution with parameters m, $\Omega$ if and only if the variable $I=r^2$ (also called the intensity) follows a gamma distribution, such as the one characterized by:

$$\mathcal{G}(I \mid k, \theta) = \frac{1}{\theta^k \Gamma(k)} I^{k-1} e^{-I/\theta} \quad (3)$$

where k=m and $\theta=\Omega/m$. Thus, for all practical purposes, the parameters of the MND model are uniquely determined by a large sample of data.

In the present embodiment, it was found convenient to work directly with gamma distributions (as gamma distributions are well-known in the statistical literature). So, in practice, in step 106, the change of variable $I=r^2$ on the ultrasound image data is first performed in order to obtain a mixture of gamma distributions (MGD)

$$f(I \mid p_1, \ldots k_1, \ldots, \theta_1, \ldots) = \sum_{i=1}^{l} p_i \mathcal{G}(I \mid k_i, \theta_i), \quad (4)$$

where the constraint $k_i\theta_i < k_{i+1}\theta_{i+1}$ is set in order to insure identifiability (k$\theta$ is the mean of a gamma distribution G(k, $\theta$). The transformed data is then normalized between 0 and $10^3$. This range seemed convenient in the context of the present embodiment. However, variations are possible as will be apparent to those skilled in the art, for example other statistical distributions having more than one parameter may be used.

The parameters of the model can be estimated using an estimation algorithm. The estimator of the parameters of the model for this embodiment of the method is as follows.

Let $\tilde{I}=I_1, I_2, \ldots, I_N$ be independent and identically-distributed (i.i.d.) samples of the MGD model. The goal is to estimate the vector of parameters $\chi=(p_i, k_i, \theta_i)$ of equation (4).

Under the Bayesian paradigm, the following priors on the parameters are set.

1. A Dirichlet prior (see for example Escobar, M, Journal of the American Statistical Association, vol. 89, no. 425, pp. 268-277, 1993) on the mixture parameters pi:

$$P(p_1, \ldots, p_l) = D(p_1, \ldots, p_l | A_0; \alpha_1, \ldots, \alpha_l) \quad (5)$$

where the Dirichlet distribution D is defined by $$\frac{\Gamma(A_0)}{\prod_{i=1}^{l} \Gamma(A_0 \alpha_i)} \prod_{i=1}^{l} p_i^{A_0 \alpha_i - 1},$$

on the simplex $$\sum_{i=1}^{l} p_i = 1$$

and $p_i \geq 0$. Note that, under a Dirichlet prior, the mean value of $p_i$ is $\alpha_i$, whereas its variance is equal to $\alpha_i(1-\alpha_i)/(A_0+1)$. Thus, the larger the confidence level $A_0$, the smaller the variance of each proportion $p_i$. The special case $A_0=1$ and $\alpha_i=1/l$ corresponds to a uniform distribution. In this embodiment, the parameters of the Dirichlet distribution are adjusted based on prior anatomical information of typical healthy patients.

2. A uniform prior on the parameters $k_i$ and $\theta_i$:

$$P(k_1, \theta_1, \ldots, k_l, \theta_l) \propto \begin{cases} 1 & \text{on } K; \\ 0 & \text{elsewhere;} \end{cases} \quad (6)$$

where K is a compact set of the form $([0,k_{max}] \times [0,\theta_{max}])^l$. In principle, one could take $k_{max}$ and $\theta_{max}$ as the upper limit of real numbers in a particular implementation. In practice, the search is restricted to a smaller domain, upon taking $k_{max}=10$ and $\theta_{max}=10^3$. The units are adjusted according to the normalization of the transformed data between 0 and $10^3$. In this embodiment, this range appeared to be amply sufficient in order to contain the estimated values of k and $\theta$.

According to this embodiment, a MAP estimator is adopted according to:

$$\hat{\chi} = \underset{\chi}{\arg\max} f(\tilde{I} \mid \chi) P(\chi). \quad (7)$$

It is known to those skilled in the art that the MAP estimator is well defined and leads to a strongly consistent estimator in the case of a MGD. The MAP can be computed using an expectation-maximization (EM) algorithm in the context of an arbitrary prior. See for example Dempster et al, Journal of the Royal Statistical Society (ser.B), vol. 39, pp. 1-38, 1977 for a known EM algorithm. The EM algorithm is an iterative computation technique of maximum likelihood estimates for incomplete data. It provides the parameters of a density distribution function in which information is hidden. The occurring probability of gray level values, or observed data, can be measured by computing the image histogram. However the class (corresponding to a distribution) to which each pixel belongs is unknown or hidden for images that are not segmented. Because the data is incomplete in terms of these classes, the EM algorithm is applied to evaluate the mixture parameters.

The applied EM algorithm is detailed in Table I and its derivation is given in Table II. It will be appreciated that the method is not limited to the use of this EM algorithm and that other estimation methods may be used. The stopping criterion adopted here is that the vector of parameters at the current iteration is at a Euclidean distance of the vector of parameters at the previous iteration that is smaller than 0.5% of its Euclidean norm (at the current iteration). In the present embodiment, the EM algorithm is run with ten random initializations, with a maximum of 10000 iterations for each run. The solution with largest posterior value is then taken.

Referring back to FIG. 2, the method steps 102, 104, 106, 108 and 110 of the first embodiment of the method 100 are now described below in more detail.

In the first step 102, the initial estimation of the boundary of the intima-media layer is performed manually by an operator selecting a number of pixels, $s_1, \ldots, s_u$, (three to five in this embodiment) within the intima-media layer from the ultrasound image displayed on the output device 22. This may be performed using an input device of the processor 24. Following this manual input by the operator, all subsequent steps are automated and can be performed by the processor 24, for example.

Figure 4:
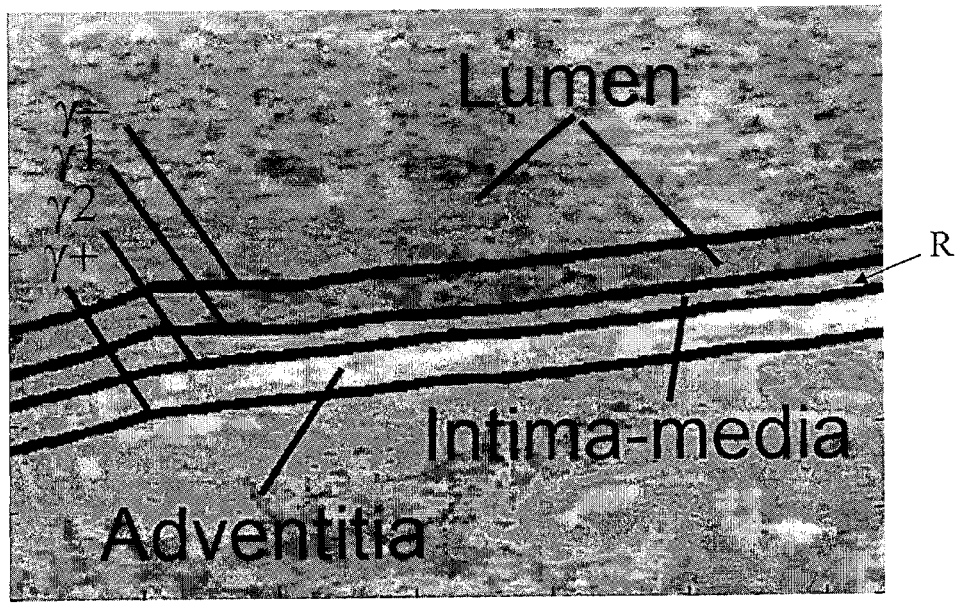
FIG. 4 is an example of an ultrasound image to be segmented and on which a region R has been determined according to a first embodiment of the method of FIG. 2.

The piecewise linear curve $\gamma_0$ defined by the manually selected pixels is computed in any manner known in the art. Then the region, R, of the image to be segmented is determined by translating $\gamma_0$ at predetermined distances toward the lumen and adventitia to obtain the boundaries of the region R. In this first embodiment, $\gamma_0$ is translated 5 mm toward the lumen to obtain $\gamma_-$ and 3 mm toward the adventitia to obtain $\gamma_+$ (FIG. 4).

In this embodiment, these predetermined distances, as well as the prior anatomical information to be used in Step 108, are based on published clinical studies of healthy carotid arteries. The clinical measurements of healthy subjects as reported in Meinders et al (Am. J. of Physiology—Heart and Circulatory Physiology, vol. 285, pp. H384-H391, 2003) were considered. This study involved the ultrasound examination of 29 women and 18 men with a mean age of 49±13 years. The distances for translating $\gamma_0$ were based on the calculation that a typical IMT plus half the lumen diameter plus 1 SD (standard deviation) of each is equal to 4.31 mm, and that the IMT plus the adventitia thickness plus 1 SD of each equals 0.73+0.28+0.90+0.82=2.73 mm.

TABLE I

The EM algorithm, which is an example of an algorithm which can be used in this embodiment of the method of the invention l — number of gamma kernels;
$I_1, \ldots, I_N$ — independent and identically-distributed (i.i.d.) samples of the mixture of gamma distributions;
$c_1, \ldots, c_N$ — the latent kernel variables;
$p_i$ — proportion of the i-th kernel;
$k_i, \theta_i$ — parameters of the i-th kernel;
$A_0, \alpha_1, \alpha_l$ — parameters for the prior on $p_1, \ldots, p_l$.

Goal: to compute the Maximum A Posterion estimator of equation (7) conditional to $I_1, \ldots, I_N$ (with at least two distinct elements).
 for j = 1, ..., N do
  Draw $c_j = i$ with probability $w_i = 1/l$.
 end for
 for i = 1, ..., l do Set $p_i = \dfrac{N_i + A_0\alpha_i - 1}{N + A_0 - 1}$, where $N_i$ is the number of labels $c_j$ equals to i.

Let $k_i, \theta_i$ be the Maximum Likelihood estimator of the
  gamma distribution on the sample $\{I_j : c_j = i\}$.
 end for
 repeat
  E-step:
  for j = 1, ..., N do Set $p(c_j = i) = \dfrac{p_i \mathcal{G}(I_j \mid k_i, \theta_i)}{\sum_{i=1}^{l} p_i \mathcal{G}(I_j \mid k_i, \theta_i)}$, for i = 1, ..., l.

end for
  M-step:
  for i = 1, ..., l do

Update $p_i = \dfrac{P_i + A_0\alpha_i - 1}{N + A_0 - 1}$, where $P_i = \sum_{j=1}^{N} p(c_j = i)$.

Solve $\log x - \psi(x) = \log \dfrac{Q_i}{P_i} - \dfrac{R_i}{P_i}$, where $\psi(x)$ denotes the digamma function $\Gamma'(x)/\Gamma(x)$. $Q_i =$ $\sum_{j=1}^{N} I_j p(c_j = i)$, and $R_i = \sum_{j=1}^{N} \log I_j p(c_j = i)$.

Note that $\log x - \psi(x)$ is a decreasing function on $(0, \infty)$, $\lim_{x \to 0} \log x - \psi(x) = \infty$ and $\lim_{x \to \infty} \log x - \psi(x) = 0$. Since $\log \dfrac{Q_i}{P_i} - \dfrac{R_i}{P_i} > 0$, under the assumption that at least two sample elements are distinct, it
   follows that x can be found by a binary search.
   Update $k_i = x$.

Update $\theta_i = \dfrac{Q_i}{k_i P_i}$ end for
 until a stopping criterion is met

TABLE II derivation of EM algorithm in the case of a mixture of gamma distributions As usual, it is convenient to introduce a latent variable $c \in \{1, 2, \ldots, l\}$, that indicates which kernel is chosen. The mixture of gamma distributions (MGD) model is then equivalent to the hierarchical model.

$$c \sim M(p_1, \ldots, p_l) \qquad (8)$$
$$I \mid c = i \sim G(k_i, \theta_i),$$

TABLE II-continued derivation of EM algorithm in the case of a mixture of gamma distributions Where M denotes the multinomial distribution.
Let $\chi^{(t)}$ be the current estimation of the parameters $(p_1, \ldots, k_1, \ldots, \theta_1, \ldots)$. Let $\tilde{c}$ be the configuration of latent labels $(c_j)$. Let $\tilde{I} = (I_1, \ldots, I_N)$ be i.i.d. samples of a mixture of gamma distributions. In the EM algorithm, one considers the expectation $$Q(\chi \mid \chi^{(t)}, \tilde{I}) = \sum_{\tilde{c}} \log\{f(\tilde{I}, \tilde{c} \mid \chi)\pi(\chi)\} p(\tilde{c} \mid \chi^{(t)}, \tilde{I}). \tag{9}$$

Up to a constant, this is equal to $$\sum_{j=1}^{N} \sum_{i=1}^{l} (\log \mathcal{G}(I_j \mid k_i, \theta_i) + \log p_i) p(c_j = i) + \sum_{i=1}^{l} (A_0 \alpha_i - 1) \log p_i, \tag{10}$$

where $p(c_j = i)$ is a short-hand for $p(c_j = i \mid \chi^{(t)}, \tilde{I})$.
The E-step consists in computing $p(c_j = i)$. Using Bayes' Theorem, one obtains $$p(c_j = i) = \frac{p_i \mathcal{G}(I_j \mid k_i, \theta_i)}{\sum_{i=1}^{l} p_i \mathcal{G}(I_j \mid k_i, \theta_i)}.$$

For the M-step, the term $\lambda\left(1 - \sum_{i=1}^{l} p_i\right)$ corresponding to the constraint $\sum_{i=1}^{l} p_i = 1$ is added to equation (28). Setting the partial derivative with respect to $p_i$ equal to 0, one obtains $$\frac{1}{p_i}\left(\sum_{j=1}^{N} p(c_j = i) + A_0 \alpha_i - 1\right) - \lambda = 0. \tag{11}$$

Setting $P_i = \sum_{j=1}^{N} p(c_j = i)$ yields $P_i + A_0 \alpha_i - 1 = p_i \lambda$. In particular, $\lambda = N + A_0 - 1$. This gives the expression $$p_i = \frac{P_i + A_0 \alpha_i - 1}{N + A_0 - 1}.$$ Moreover, setting the partial derivatives with respect to $k_i$ and $\theta_i$ equal to 0, one obtains respectively the equations $$\sum_{j=1}^{N} (-\log \theta_i - \psi(k_i) + \log I_j) p(c_j = i) = 0; \tag{12}$$

$$\sum_{j=1}^{N} \left(-\frac{k_i}{\theta_i} + \frac{I_j}{\theta_i^2}\right) p(c_j = i) = 0. \tag{13}$$

Setting $Q_i = \sum_{j=1}^{N} I_j p(c_j = i)$, equation (13) implies the identity $\theta_i = \frac{Q_i}{k_i P_i}$.

Substituting back into equation (30), and setting $R_i = \sum_{j=1}^{N} \log I_j p(c_j = i)$, one obtains the updating expression for $k_i$:

$$\log k_i - \psi(k_i) = \log \frac{Q_i}{P_i} - \frac{R_i}{P_i},$$ where $\psi(x)$ denotes the digamma function $\Gamma'(x)/\Gamma(x)$. Now, the function log being concave on $(0, \infty)$, it follows TABLE II-continued derivation of EM algorithm in the case of a mixture of gamma distributions from Jensen's inequality that $\log\frac{Q_i}{P_i} - \frac{R_i}{P_i} \geq 0$, where equality holds if and only if all $I_j$ are mutually equal. This latter case happening with probability 0, it follows that $\log\frac{Q_i}{P_i} - \frac{R_i}{P_i} > 0$ with probability 1. Since $\log x - \psi(x)$ is a decreasing function on $(0, \infty)$,
$\lim_{x\to 0}\log x - \psi(x) = \infty$ and $\lim_{x\to\infty}\log x - \psi(x) = 0$, one concludes that
$k_i > 0$ can be found by a binary search, unless all data elements are mutually equal.

---

This was based on a segmentation problem formulated as follows. Given a sequence of T RF images, let $r^{(t)}$ denote the brightness of the B-mode envelope of the RF signal in the t-th frame, i.e. the norm of the Hilbert operator applied to the RF signal. This brightness reflects the local echogenicity of the underlying configuration of scatterers filtered by the point-spread function of the imaging system, but not directly the tissue structure.

Let R be the region of interest that includes the inferior intima-media thickness on a longitudinal view of the artery, the adventitia, and at least 50% of the lumen, and that is delimited by two curves $\gamma_-$ and $\gamma_+$, with $\gamma_-$ in the lumen and $\gamma_+$ outside the carotid artery. The orientation of the axial axis is from the lumen toward the carotid artery wall of interest. In particular, $\gamma_- \leq \gamma_+$.

For each ultrasound frame t, let $I^{(t)}$ be the observable random field ($I_s^{(t)}$), where $I_s^{(t)}$ is the square of the brightness $r_s^{(t)}$ at pixel s of the corresponding B-mode image. Also, let $\gamma_1^{(t)}$ and $\gamma_2^{(t)}$ represent the interface between the intima-media thickness and the lumen or the adventitia, respectively, in the t-th frame. In particular, $\gamma_1^{(t)}$ and $\gamma_2^{(t)}$ satisfy the point-wise relations $\gamma_- \leq \gamma_1^{(t)} \leq \gamma_2^{(t)} \leq \gamma_+$. The pair of curves ($\gamma_1^{(t)}$, $\gamma_2^{(t)}$) is viewed as a hidden discrete random field. The segmentation problem can then be formulated as the estimation of ($\gamma_1^{(t)}$, $\gamma_2^{(t)}$) conditional to $I^{(t)}$.

The Meinders et al study was also used to set a uniform prior for the segmentation model. From the four categories defined in Table 2 of the Meinders et al study, it was inferred that the overall IMT in the common carotid artery is $\mu=0.635$ mm with a spatial intra-subject variance of $\sigma_s^2=(0.1411)^2$ mm$^2$ and a temporal intra-subject variance of $\sigma_t^2=(0.1208)^2$ mm$^2$.

Furthermore, in this embodiment, prior information on the lumen diameter and the adventitia thickness was obtained from a study of Kazmierski et al (Journal of Neuroimaging, vol. 14, no. 3, pp. 258-264, 2004) in which 233 patients (113 women and 120 men) with a mean age of 61.6±9.7 years underwent ultrasound examination. The study population consisted of 104 ischemic stroke patients and 129 patients without stroke. The study reported that the IMT in the common carotid artery was 0.73±0.28 mm, the lumen diameter was 5.67±0.93 mm, the interadventitial diameter was 7.31±1.10 mm, and the outer artery diameter was 9.11±1.22 mm. It was inferred that the adventitia thickness was 0.90±0.82 mm.

Figure 5:
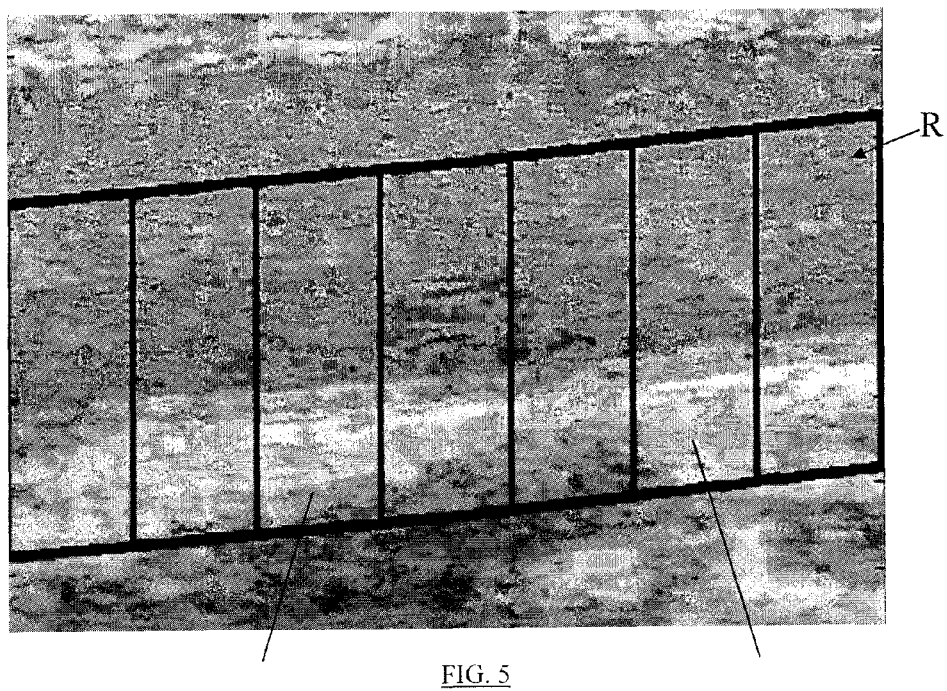
FIG. 5 is the ultrasound image of FIG. 4 in which the region R has been divided into non-overlapping windows.

In step 104, a plurality of pixels between the curves $\gamma_-$ and $\gamma_+$ (region R) are sampled. However, in order to take into account the longitudinal echogenicity variations of the artery, the region R is partitioned into B vertical strips of about 3 mm (i.e. 20 pixels) wide each before sampling (FIG. 5). In this embodiment, 800 pixels are selected randomly according, for example, to a uniform distribution from each vertical strip as this was found to be statistically representative of the image data in the region R. Alternatively, any other number of pixels can be sampled or all the pixels in the region considered. It is to be appreciated that for a sample which does not exhibit any or significant echogenicity variation, the partitioning of the region R into strips is not necessary. It will also be appreciated that when partitioning is favoured, the vertical strips need not be vertical or be strips but can be sampling windows of any shape or orientation.

In step 106, the brightness values of the sample of pixels in region R are modelled using a mixture of Nakagami distributions. Equivalently, the intensity values (i.e. the square of the brightness values) can be modelled using a mixture of gamma distributions. Namely, the distribution of the intensity ($I_s^{(t)}$) into each strip b is modeled by a mixture of three gamma distributions $$\sum_{i=1}^{3} p_{b,i}^{(t)} \mathcal{G}(I_s^{(t)} \mid k_{b,i}^{(t)}, \theta_{b,i}^{(t)}). \tag{14}$$

The distributions are ordered by increasing value of the means $k_{b,i}^{(t)}$, $\theta_{b,i}^{(t)}$.

Figure 6:
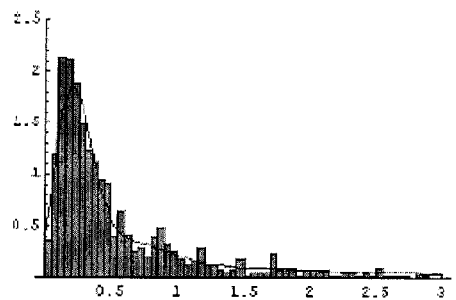
FIG. 6 is a histogram of the distribution of brightness values of a sample of pixels taken from one of the windows of FIG. 5 statistically described as a mixture of three Nakagami distributions according to an embodiment of the method of the invention.
Figure 7A:
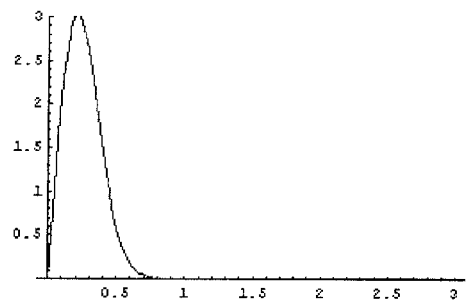
FIGS. 7A-7C are estimated Nakagami distributions for each component of the window of FIG. 6.
Figure 7B:
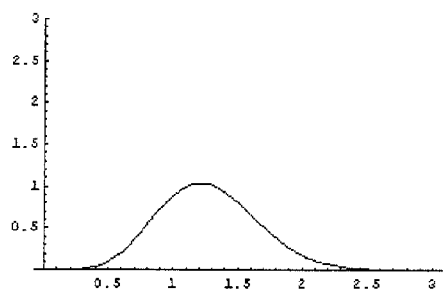
Figure 7C:
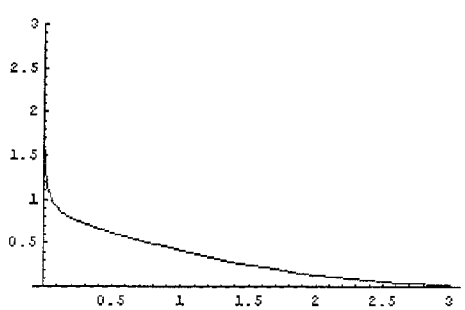

FIGS. 6 and 7 illustrate an example of an estimated mixture of three statistical distributions and its comparison with the empirical distribution.

In the present embodiment, the following assumptions are made on the weights of each distribution for each of the relevant components.

1) The lumen corresponds locally to the distribution with lowest mean $$f_{b,1}^{(t)}(I_s^{(t)}) = G(I_s^{(t)} \mid k_{b,1}^{(t)}, \theta_{b,1}^{(t)}, \tag{15}$$

since the lumen presents the lowest intensity when low to mid range frequency transducers are used. This assumption is not restrictive and can be modified in the case of a high frequency transducer where the brightness of the lumen may be important and as strong as the blood vessel wall.

2) The intima-media thickness corresponds locally to the mixture $$f_{b,2}^{(t)}(I_s^{(t)}) = \sum_{i=1}^{3} q_{b,i}^{(t)} \mathcal{G}(I_s^{(t)} \mid k_{b,i}^{(t)}, \theta_{b,i}^{(t)}), \tag{16}$$

where $$\sum_{i=1}^{3} q_{b,i}^{(t)} = 1$$

and $q_{b,i}^{(t)} \geq 0$. One could have also considered only the gamma distribution $G(I_s^{(t)}|k_{b,2}^{(t)}, \theta_{b,2}^{(t)})$. But, in practice, the intima-media thickness presents the three types of intensity. The Applicants found that for most images in their database, the media cannot be really distinguished from the intima tissue. Thus, the media does not correspond necessarily to one of the gamma distributions. A discussion on how the weights $q_{b,i}^{(t)}$ are adjusted is included in step 108. Note that the mixture of statistical distributions is not limited to three and can be more or less depending on the components being imaged, such as the complexity of the echo intensity texture.

3) The adventitia corresponds locally to the distribution with highest mean $$f_{b,3}^{(t)}(I_s^{(t)}) = G(I_s^{(t)}|k_{b,3}^{(t)}, \theta_{b,3}^{(t)}) \qquad (17)$$

since the adventitia presents the highest intensity. This assumption is also not restrictive and can be adapted according to the characteristic of the ultrasound images.

Ideally, the estimation of the parameters should be performed in a vertical strip centered at each pixel s in the region of interest R. Since this would have resulted in time consuming computations, we actually considered Bayesian model averaging as follows. Let s be a pixel in the region of interest R, and assume that the vertical strip of width 3 mm centered at s has proportion $q_s$ of its area contained into the b-th strip and the remaining part contained into the (b+1)-th strip. Then, we set $$f_i^{(t)}(I_s^{(t)}) = q_s f_{b,i}^{(t)}(I_s^{(t)}) + (1-q_s)f_{b+1,i}^{(t)}(I_s^{(t)}). \qquad (18)$$

The proposed averaging operator yields a smoother transition of the distributions from one vertical strip to another. As a simpler alternative, one could also use directly $$f_i^{(t)}(I_s^{(t)}) = f_{b,i}^{(t)}(I_s^{(t)}). \qquad (19)$$

In step 108, the parameters of the model of step 106 are estimated as follows. The parameters of equation (14) are estimated using the EM algorithm of Table I. Let $\lambda$ be the average axial distance between $\gamma_+$ and $\gamma_-$. Let $\mu$=0.635 and $\sigma_s$=0.1411 be the mean and the spatial standard deviation of the IMT. Then, the hyper-parameters of the Dirichlet prior is adjusted on the proportions $p_i$ of the MGD by setting $\alpha_2 = \mu/\lambda$, thus imposing the prior average thickness $\mu$ to the region corresponding to the second gamma distribution. The two other gamma distributions are given an equal prior weight of $\alpha_1 = \alpha_3 = (\lambda-\mu)/(2\lambda)$, so that $\alpha_1+\alpha_2+\alpha_3=1$. Also, from the anatomical specifications, we want the variance of $p_2$ to be equal to $(\sigma_s/\lambda)^2$. Since the variance of the marginal variable $p_2$ of the Dirichlet distribution is equal to $\alpha_2(1-\alpha_2)/(A_0+1)$, one obtains $A_0 = \alpha_2(1-\alpha_2)(\lambda/\sigma_s)^2 - 1$, upon solving the equation $\alpha_2(1-\alpha_2)/(A_0+1) = (\sigma_s/\lambda)^2$. The weights $p_{b,i}^{(t)}$ are then dropped out, but the other parameters $k_{b,i}^{(t)}$, $\theta_{b,i}^{(t)}$ are used subsequently.

Then, the weights of each distribution in the case of the lumen and the adventitia are set according to equations (15) and (17), respectively. As for the weights $q_{b,i}^{(t)}$ for the intima-media layers, for the first frame, the values $q_{b,1}^{(t)} = q_{b,2}^{(t)} = q_{b,3}^{(t)} = \frac{1}{3}$ are taken in equation (16). The distributions $f_i$, for i=1, 2, 3, are constructed as stated earlier. (c.f. equations (15), (16), (17), and (18)).

In step 110, using the definition of the curves $\gamma_1^{(t)}$ and $\gamma_2^{(t)}$, the assumptions (15), (16), and (17), the likelihood of a Bayesian segmentation model is defined, for example, as $$f(I^{(t)}|\gamma_1^{(t)}, \gamma_2^{(t)}) = \prod_{\gamma_- \leq s \leq \gamma_1^{(t)}} f_1^{(t)}(I_s^{(t)}) \times \prod_{\gamma_1^{(t)} \leq s \leq \gamma_2^{(t)}} f_2^{(t)}(I_s^{(t)}) \times \sum_{\gamma_2^{(t)} \leq s \leq \gamma_+} f_3^{(t)}(I_s^{(t)}). \qquad (20)$$

For the purpose of considering various priors that set regularizing constraints on the segmentation, let $\gamma$ be a continuous piecewise linear curve of the form $(1, y_1), \ldots, (L, y_L)$, where the first coordinate indicates the longitudinal position and the second component indicates the axial position (these correspond to the horizontal and the vertical positions, respectively, in FIG. 5). Thus, the curve $\gamma$ is parametrized by $\gamma(x)=(x, y(x))$. Let $$\bar{y} = \frac{1}{L} \int_1^L \dot{y}(x)\,dx,$$

where $$\dot{y} = \frac{dy}{dx}.$$

A smoothing spatial constraint is defined by the normalized geometrical energy (or action) of the curve $\gamma$ $$\Delta_{sm}(\gamma) = \int_1^L |\dot{y}(x) - \bar{y}|^2\,dx. \qquad (21)$$

This quantity is computed with the approximation $$\Delta_{sm}(\gamma) = \sum_{l=1}^{L-1} (s_l - \bar{s})^2, \qquad (22)$$

where $s_l = y_{l+1} - y_l$, and $\bar{s}$ is the average value of $s_1, \ldots, s_{L-1}$.

Next, let $\gamma$ and $\gamma'$ be two curves of the form $(1, y_1), \ldots, (L, y_L)$ and $(1, y'_1), \ldots, (L, y'_L)$, respectively.

Let $d_l = y_l - y'_l$ (in mm), for l=1, ..., L. A thickness spatial constraint is defined by the prior statistical energy $$\Delta_{th}(\gamma, \gamma') = -\sum_{l=1}^{L} \log \mathcal{N}(d_l|\mu, \sigma_s) = \frac{1}{2\sigma_s^2} \sum_{l=1}^{L} (d_l - \mu)^2, \qquad (23)$$

where $\mu$ and $\sigma_s$ are as in Section III-A, and N stands for the Gaussian distribution.

Then, a spatial prior for the first frame is defined by $$P_1(\gamma_1^{(1)}, \gamma_2^{(1)}) \propto \exp(-\beta \Delta_{sm}(\gamma_1^{(1)}) - \beta \Delta_{sm}(\gamma_2^{(1)}) - \Delta_{th}(\gamma_1^{(1)}, \gamma_2^{(1)})), \qquad (24)$$

where $\beta$ is a positive real number. In the present embodiment, the value of $\beta$ was fixed throughout to two. Alternatively, the value of this parameter can be estimated.

Finally, the temporal constraint is defined by the prior statistical energy $$\Delta_{tm}(\gamma, \gamma') = -\sum_{l=1}^{L} \log \mathcal{N}(d_l \mid 0, \sigma_t) = \frac{1}{2\sigma_t^2} \sum_{l=1}^{L} d_l^2, \quad (25)$$

with $\sigma_t$ as obtained from the published clinical data of healthy carotid arteries.

Then, if $\gamma_1^{(t)}$ and $\gamma_2^{(t)}$ are the intima-media thickness boundaries in the t-th frame, a spatio-temporal prior for the (t+1)-th frame is defined by $$P_{t+1}(\gamma_1^{(t+1)}, \gamma_2^{(t+1)} \mid \gamma_1^{(t)}, \gamma_2^{(t)}) \propto \exp(-\beta \Delta_{sm}(\gamma_1^{(t+1)}) - \beta \Delta_{sm}(\gamma_2^{(t+1)})) \times \exp(-\Delta_{th}(\gamma_1^{(t+1)}, \gamma_2^{(t+1)})) \times \exp(-\Delta_{tm}(\gamma_1^{(t+1)}, \gamma_1^{(t)}) - \Delta_{tm}(\gamma_2^{(t+1)}, \gamma_2^{(t)})). \quad (26)$$

For the first frame, the posterior distribution of this Bayesian segmentation model is expressed as $$P_1(\gamma_1^{(1)}, \gamma_2^{(1)} \mid I^{(1)}) \propto f(I^{(1)} \mid \gamma_1^{(1)}, \gamma_2^{(1)}) P_1(\gamma_1^{(1)}, \gamma_2^{(1)}) \quad (27)$$

(c.f. equations (12) and (16)). For the (t+1)-th frame, one obtains from equations (12) and (18) the posterior distribution $$P_{t+1}(\gamma_1^{(t+1)}, \gamma_2^{(t+1)} \mid I^{(t+1)}, \gamma_1^{(t)}, \gamma_2^{(t)}) \propto f(I^{(t+1)} \mid \gamma_1^{(t+1)}, \gamma_2^{(t+1)}) P_{t+1}(\gamma_1^{(t+1)}, \gamma_2^{(t+1)} \mid \gamma_1^{(t)}, \gamma_2^{(t)}). \quad (28)$$

The segmentation of the intima-media thickness is then viewed as the following sequential MAP estimators:

$$(\gamma_1^{(1)}, \gamma_2^{(1)}) = \arg\max P_{t+1}(\gamma_1, \gamma_2 \mid I^{(1)}); \quad (29)$$

$$(\gamma_1^{(t+1)}, \gamma_2^{(t+1)}) = \arg\max P_{t+1}(\gamma_1, \gamma_2 \mid I^{(t+1)}, \gamma_1^{(t)}, \gamma_2^{(t)}),$$

where t=1, ..., T−1.

In step 110, the segmentation of the ultrasound image is performed (i.e. optimization of the IMT) preferably using an optimization algorithm. The continuous piecewise linear curves $\gamma_1^{(1)}$ and $\gamma_2^{(1)}$ located within 2 mm above and below $\gamma_0$, that maximize the posterior distribution of equation (27) are computed using an optimization algorithm. Note that the IMT plus 3 SD is equal to 1.57 mm. However, in this embodiment an anatomical prior of 2 mm is taken to cover an even wider span.

In the present embodiment, the optimization algorithm is an Exploration/Selection (ES) global minimization algorithm (see for example Francois, Ann. Appl. Probab., Vol. 12, no. 1, pp. 248-271, 2002). The ES algorithm is a particular generalized simulated annealing algorithm, that finds asymptotically a global minimum of a function F defined on a finite search space E. A population of n solutions (or particles) is initialized randomly. Then, at each iteration and for each solution independently of the others, two operators are available: the random exploration of a solution within a neighbourhood of the search space endowed with a connected graph structure (exploration step), or the replacement of the solution by the best solution of the previous iteration (selection step). The exploration is chosen with probability $p_i$, called the exploration probability that depends on the iteration i. This probability decreases to 0 as the number of iterations increases, at a known rate that ensures convergence to the optimal solution (see Table III). Namely, let $\tilde{D}$ be the diameter of the search space endowed with its connected graph structure. In order that the ES algorithm converge to a global minimum, it is sufficient to have n>$\tilde{D}$ (number of particles) and $p_i = i^{-1/\tau}$, where $\tau \geq \tilde{D}$. Detailed explanations will not be provided here as they will be familiar to those skilled in the art (see for example Francois, Ann. Appl. Probab. Vol. 12, no. 1, pp. 248-271, 2002).

In the present embodiment, a more flexible form of the ES algorithm is as the exploration distribution can be any positive distribution on the neighbourhood of a solution, and not just the uniform distribution considered in the art.

TABLE III

The ES algorithm, which is an example of an algorithm which can be used in this embodiment of the method of the invention

| | |
|---|---|
| $(\gamma_1, \gamma_2)$ | pair of intima-media piecewise linear curves; |
| L | number of control points on each curve; |
| $F((\gamma_1,\gamma_2))$ | $-\log P_1(\gamma_1,\gamma_2 \mid I^{(1)})$ or $-\log P_{t+1}(\gamma_1,\gamma_2 \mid I^{(t+1)},\gamma_1^{(t)},\gamma_2^{(t)})$; |
| n | size of the population (n=30); |
| i | iteration number; |
| $((\gamma_1,\gamma_2)_l^{[i]})$ | population of the pairs of intima-media curves at iteration i, with l = 1,..., n; |
| $p_i = i^{-1/\tau}$ | probability of exploration at iteration i ($\tau$ = 15 in our tests); |
| r | radius of exploration (r = 1/8 in our tests); |
| D = 1/(2r) | diameter of exploration; |

Parameter initialization: Initialize randomly $(\gamma_1,\gamma_2)_l^{[0]}$, for l = 1,..., n.
Set i = 1.
repeat
  Update i ← i + 1.
  Determine the best current solution $\alpha(((\gamma_1,\gamma_2)_l^{[i]})) = (\gamma_1,\gamma_2)_l^{[i]}$, where
  $F((\gamma_1,\gamma_2)_k^{[i]}) > F((\gamma_1,\gamma_2)_l^{[i]})$ for k < l, and $F((\gamma_1,\gamma_2)_k^{[i]}) \geq F((\gamma_1,\gamma_2)_l^{[i]})$
  for k > l.
  for l = 1, 2,..., n do
    Let u be a random number between 0 and 1.
    if u ≤ $p_i = i^{-1/\tau}$ then
      Exploration: Draw j from a binomial distribution B(1/(D−1), D−1).
      Set $(\gamma_1,\gamma_2) = (\gamma_1,\gamma_2)_l^{[i]}$.
      for j + 1 times do
        Replace $(\gamma_1,\gamma_2)$ by $(\gamma_1',\gamma_2')$ drawn as follows.
        for j = 1,..., L do
          With probability 1/L, set randomly the j-th control point (c.p.)
          of $\gamma_1'$ within a radius r of the j-th c.p. of $\gamma_1$ and between $\gamma_-$
          and $\gamma_+$. Then, set randomly the j-th c.p. of $\gamma_2'$ within a radius
          the j-th c.p. of $\gamma_2$, with the constraint that it is located between
          r of the j-th c.p. of $\gamma_1'$ and $\gamma_+$. Else, set the j-th c.p.
          of $\gamma_1'$ and $\gamma_2'$ equal to the corresponding point of
          $\gamma_1$ and $\gamma_2$ respectively.
        end for
      end for
      Set $(\gamma_1,\gamma_2)_l^{[i+1]} = (\gamma_1,\gamma_2)$.
    else
      Selection: Set $(\gamma_1,\gamma_2)_l^{[i+1]} = \alpha(((\gamma_1,\gamma_2)_l^{[i]}))$
    end if
  end for
until a stopping criterion is met In this embodiment, the function F is as in Table III, and the search space is the set of pairs of curves $(\gamma_1,\gamma_2)$. Each piecewise linear curve being described by L control points, the search space is considered as $E = \{(\gamma_1,\gamma_2): \gamma_- \leq \gamma_1 \leq \gamma_2 \leq \gamma_+\}$. That set is finite upon considering a finite precision for real numbers on the computer. The graph structure is defined by the symmetric relation $(\gamma_1,\gamma_2) \sim_r (\gamma'_1,\gamma'_2)$ if and only if the axial coordinate of each control point of $\gamma_1$ ($\gamma_2$) is within a distance r of the axial coordinate of the corresponding point of $\gamma'_1$ ($\gamma'_2$, respectively). For each control point, the distance is normalized so that the axial coordinates of $\gamma_-$ and $\gamma_+$ are at a distance equal to 1. With that graph structure, the search space has diameter equal to 1/r (in the present embodiment, r=⅛ is taken systematically). In the ES algorithm, the symbol r should not be confused with the speckle brightness r.

Next, if D=1/(2r) is set and we let the exploration step consist of up to D basic explorations within a distance r (the number of steps being drawn from a binomial distribution), then the diameter of the new implicit underlying graph structure is equal to $\tilde{D}$=2. (Incidentally, if one wished to have $\tilde{D}$=1, one should take D=1/r.) Thus, it is enough to take n>$\tilde{D}$=2 and $\tau \geq \tilde{D}$=2 in order to have the asymptotic convergence property. In the present embodiment, n=30 was taken. Alternatively, have more particles than needed may be taken in order to accelerate the convergence of the algorithm. Here, the value τ=15 in Table III was taken as it was found empirically that τ=n/2 is in general a good choice. Similar choices of the internal parameters of the ES algorithm are described in Destrempes et al, IEEE Trans. Image Processing, vol. 15, no. 10, pp. 2920-2935, 2006 and Destrempes et al, IEEE Trans. Pattern Anal. Machine Intell. Vol. 28, no. 9, pp. 1603-1615, 2007.

The application of the ES algorithm in the context of this embodiment can be viewed as a variant of known localization and reconstruction methods. Strictly speaking, equation (26) is equivalent to Gaussian statistical shape prior on the intima-media thickness of the carotid artery (in a longitudinal view).

However, contrary to known methods, no reduction of dimensionality has been used in the present embodiment. Instead, the variant presented in Table III is based on local moves of the control points (of the piecewise linear curves). In particular, the proposed variant could be well adapted to free curves (i.e. without shape prior).

Optionally, this embodiment of the method 100 may include an additional step 112 which includes using the optimized boundary from the first frame to at least semi-automatically calculate an optimized boundary in a subsequent frame or frames of the ultrasound sequence. In this step, estimation in the subsequent frames is as follows:

Let $\gamma_1^{(t)}$ and $\gamma_2^{(t)}$ be the two solutions of the current frame t. Two curves $\gamma_-$ and $\gamma_+$ are obtained by translating $\gamma_1^{(t)}$ 3 mm toward the lumen, and $\gamma_2^{(t)}$ 2 mm toward the adventitia, respectively. As stated previously, half the lumen plus 1 SD is equal to 3.3 mm, whereas the adventitia thickness plus 1 SD is equal to 1.72 mm. Now, the estimation as in Step 108 is performed, but with the following modifications.

Let $\lambda_-$ and $\lambda_+$ be the average axial distances between $\gamma_-$ and $\gamma_1^{(t)}$, and between $\gamma_2^{(t)}$ and $\gamma_+$, respectively. Let $\lambda=\lambda_-+\mu+\lambda_+$. We set $\alpha_1=\lambda_-/\lambda$, $\alpha_2=\mu/\lambda$, and $\alpha_3=\lambda_+/\lambda$, in order to impose the prior average thickness $\lambda_-$, $\mu$, or $\lambda_+$ to the region corresponding to the first, second, or third gamma distribution, respectively (or less than or more than three distributions depending on the application). Also, from the anatomical specifications, we want the variance of $p_2$ to be equal to $(\sigma_s/\lambda)^2$. The value $A_0=\alpha_2(1-\alpha_2)(\lambda/\sigma_s)^2-1$ is then deduced as mentioned above.

In equation (16), $q_{b,i}^{(t)}$ is estimated as the proportion of points in the b-th strip between $\gamma_1^{(t)}$ and $\gamma_2^{(t)}$ for which the distribution $G(k_{b,i}^{(t)}, \theta_{b,i}^{(t)})$ estimated at the current frame is more likely than the two other distributions (i.e. the proportion of the i-th hidden label corresponding to the i-th appearing in a Maximum Likelihood classification of the pixels).

Segmentation (optimization) in the subsequent frames is then performed as follows: The continuous piecewise linear curves $\gamma_1^{(t+1)}$ and $\gamma_2^{(t+1)}$ within 1 mm toward the lumen from $\gamma_1^{(t)}$ and 1 mm toward the adventitia from $\gamma_2^{(t)}$ that maximize the posterior distribution of equation (28) are computed using the optimization algorithm described for Step 110. The choice of 1 mm is arbitrary, but it seems amply sufficient to allow tracking the movement of the wall from one frame to the next one, provided the transducer is held fixed.

This embodiment of the method 100 may include a further (optional) step 114 to correct errors found in the first few frames due to an error in the initialization. In step 114, once the required number of frames of the ultrasound video sequence has been segmented, the first twenty frames are estimated and segmented again using the solution found at an intermediate frame, such as the 21st frame for example, and working backwards. FIG. 8A and FIG. 8B illustrate two frames of a sequence which have been segmented according to this embodiment of the method. Only the bottom wall of the carotid artery is shown in these illustrative figures but the method can equally be applied to the top wall of the artery or any other blood vessel.

It will be appreciated that steps 104-114 and any of the subsequent optional steps can be automated or at least semi-automated so that manual input is required only at the first step of the method. It will also be appreciated that some or all of the steps may be performed simultaneously.

Example 1 sets out an evaluation of the estimation and segmentation aspects of the present embodiment of the method:

Example 1

The semi-automated method of the first embodiment of the present invention (Steps 102-114) was evaluated by comparing images segmented by the semi-automated method to manually segmented images as a comparison.

Method:

N=30 video sequences of B-mode images from 15 healthy subjects were considered. It was presumed each subject had disease-free carotid arteries. For each subject, longitudinal views of the right distal common carotid artery and right proximal internal carotid were acquired by one expert radiologist, for a total of two video sequences per patient. The number of expert technicians for the manual segmentations was two.

Two versions of the method of the first embodiment were tested: 1) the MGD model (which is equivalent to a mixture of Nakagami distributions after the change of variable I=$r^2$) estimated by the EM algorithm; 2) the Mixture of Exponential Distributions (MED) model (which is equivalent to the mixture of Rayleigh distributions after the same change of variable) estimated by the EM algorithm. The Rayleigh distribution is a sub-class of the Nakagami distribution group (for m=1). The MED is the statistical model that applies when the square of the intensity is taken (as it is done to go from Nakagami to the gamma distributions).

The following evaluation of the estimation method was performed. Let $$\sum_{i=1}^{3} p_{b,i}^{(t)} \mathcal{G}(I_s^{(t)} | k_{b,i}^{(t)}, \theta_{b,i}^{(t)})$$

be estimated mixture of gamma distributions in the bth strip of the t-th frame. We want to test the goodness-of-fit of that distribution on the corresponding sample set $\tilde{I}$. For that purpose, we propose the following Bayesian test using quantiles of distributions (see e.g. The Bayesian Choice, Second edition, Springer-Verlag, 2001).

Given a fixed number of bins M, and a distribution $f(I)$, the M equiprobable bins $B_1, \ldots, B_M$ corresponding to the M quantiles of $f$ were considered. Next, given a sample $\tilde{I}$ of size N, let $N_i$ be the number of samples falling in the i th bin, for i=1, ..., M. It is assumed that the numbers $N_1, \ldots, N_M$ follow a multinomial distribution $$M(N_1, \ldots, N_M | p_1, \ldots, p_M) = \frac{N!}{\prod_{i=1}^{M} N_i!} \prod_{i=1}^{M} p_i^{N_i},$$

with unknown parameters $\vec{p}=(p_1,\ldots,p_M)$. The null hypothesis is tested $H_0$: $\vec{p}=\vec{p}_0=(1/M,\ldots,1/M)$, for if $f$ were the true distribution for the sample $\tilde{l}$, each bin would have probability $1/M$ (by construction). The alternative hypothesis is $$H_1: \vec{p} \in \Theta_1 = \left\{(p_1,\ldots,p_M): p_i \geq 0, \sum_{i=1}^{M} p_i = 1\right\} \setminus \{\vec{p}_0\}.$$

The likelihood $f(\tilde{l}|\vec{p}_0)=M(N_1,\ldots,N_M|1/M,\ldots,1/M)$ under the null hypothesis is equal to $$\frac{N!}{\prod_{i=1}^{M} N_i!} \prod_{i=1}^{M} M^{-N_i} = \frac{N!}{\prod_{i=1}^{M} N_i!} M^{-N}. \quad (30)$$

The Dirichlet Distribution $$g_1(\vec{p}) = \mathcal{D}(p_1,\ldots,p_M | M/2; 1/M,\ldots,1/M) = \frac{\Gamma(M/2)}{\prod_{i=1}^{l} \Gamma(1/2)} \prod_{i=1}^{l} p_i^{-1/2}$$

was chosen as prior for $\vec{p}$. This is a known prior called Jeffrey's prior for the multinomial model. The corresponding marginal $m_1(\tilde{l}) = \int_{\Theta_1} f(\tilde{l}|\vec{p}) g_1(\vec{p}) d\vec{p}$ is equal to $$\int_{\Theta_1} \frac{N!}{\prod_{i=1}^{M} N_i!} \frac{\Gamma(M/2)}{\Gamma(1/2)^M} \prod_{i=1}^{M} p_i^{N_i - 1/2} d\vec{p} = \quad (31)$$

$$\frac{N!}{\prod_{i=1}^{M} N_i!} \frac{\Gamma(M/2)}{\Gamma(1/2)^M} \frac{\prod_{i=1}^{M} \Gamma(N_i + 1/2)}{\Gamma(N + M/2)}.$$

The Bayes factor is obtained $$B_{0,1} = \frac{f(\tilde{l}|\vec{p}_0)}{m_1(\tilde{l})} = \frac{\Gamma(1/2)^M}{\Gamma(M/2)} \frac{\Gamma(N + M/2)}{\prod_{i=1}^{M} \Gamma(N_i + 1/2)} M^{-N}. \quad (32)$$

The null hypothesis $H_0$ is accepted if and only if $B_{0,1} \geq 1$.

The following evaluation of the segmentation was performed. For each sequence of the N video sequences, one expert chose a region of interest and a temporal interval of two to three cardiac cycles. Then, two independent experts segmented manually the intima-media thickness for each frame of these N sequences. This yields the curves and $\gamma_{i,j,1}^{(t)}$ and $\gamma_{i,j,2}^{(t)}$ for the i-th sequence (i=1,\ldots,N), obtained by the j-th expert (j=1,2), on the t-th frame (the maximal value T(i) for t varies with the sequence and corresponds to two to three cycles). Also, applying the segmentation method of the present embodiment to the same sequences, one obtains the curves $\gamma_{i,0,1}^{(t)}$ and $\gamma_{i,0,2}^{(t)}$ for the i-th sequence on the t-th frame.

Now, let $D(\gamma,\gamma')$ be a distance between two curves. The average point-to-point distance and the Hausdorff point-to-point distance between the two curves were considered. One then defines the following distance between two segmentations $j \neq j' \in \{0, 1, 2\}$ of a same video sequence i $$D_{i,j,j'} = \max\left\{\frac{1}{T(i)} \sum_{t=1}^{T(i)} D(\gamma_{i,j,1}^{(t)}, \gamma_{i,j',1}^{(t)}), \frac{1}{T(i)} \sum_{t=1}^{T(i)} D(\gamma_{i,j,2}^{(t)}, \gamma_{i,j',2}^{(t)})\right\}. \quad (33)$$

For each pair of indices $j \neq j' \in \{1,2\}$ and for each index $k \in \{1,2\}$, the population of distances between the segmentation of the experts j and j' was compared, i.e. $D_{1,j,j'}, \ldots, D_{N,j,j'}$, with the population of distances between the semi-automatic segmentation and the segmentation of expert k, i.e. $D_{1,0,k}, \ldots, D_{N,0,k}$. This leads to the one-sided p-value of Welch's approximate t-test that the random variable $D_{\bullet,0,k}$ is no more than $D_{\bullet,j,j'}$ (null hypothesis)}. With a confidence level of $\alpha=0.05$, the test succeeds whenever $p \geq 0.05$. Note that $$\frac{1}{N} \sum_{i=1}^{N} D_{i,0,k} \leq \frac{1}{N} \sum_{i=1}^{N} D_{i,j,j'}$$

if and only if $p \geq \frac{1}{2}$.

Results and Discussion

Performance of the Estimation Method:

Using the evaluation method described above, the goodness-of-fit of the estimated mixtures of distributions performed on the 30 video sequences was prepared. For the distal common carotid artery, the percentage of success of the goodness-of-fit was 83.2% with the MGD model, but only 73.4% with the MED model. For the internal proximal carotid artery, the percentage of success was 91.5% with the MGD model, but it was reduced to 87.7% with the MED model. The mean value and standard deviation of the estimated parameters of the gamma distributions (using the EM algorithm) are presented in Table IV.

TABLE IV mean and standard deviation of the shape parameter k and the average kθ of the three gamma distributions, as estimated over all vertical strips and all frames of the 30 sequences with the EM algorithm of Table I

| distribution | common carotid artery (N = 7283) | proximal internal carotid artery (N = 9200) |
| --- | --- | --- |
| lumen | k = 0.94 ± 0.21 and kθ = 0.31 ± 1.34 | k = 0.99 ± 0.19 and kθ = 0.42 ± 1.13 |
| intima-media distr. | k = 1.45 ± 1.54 and kθ = 2.86 ± 6.44 | k = 1.74 ± 1.67 and kθ = 3.98 ± 11.35 |
| adventitia | k = 0.42 ± 0.14 and kθ = 22.11 ± 26.77 | k = 0.54 ± 0.26 and kθ = 22.06 ± 28.22 |

Performance of the Segmentation Method:

In this example, one operator chose the initial points for the initial boundary estimation in the 30 video sequences. Another operator (a clinician) confirmed that there were no atherosclerotic plaque appearing in the video sequences of the internal proximal carotid and distal common carotid arteries. This prior information was used only for the semi-automatic computerized segmentations. The manual segmentations were performed independently by the two technical experts. In particular, they had to decide independently on the presence of plaques. Furthermore, the two operators decided to restrict the region of interest R in the case of 3 of these video sequences of the internal proximal carotids, due to a great uncertainty in the location of the intima-media thickness (FIG. 9).

Figure 10:
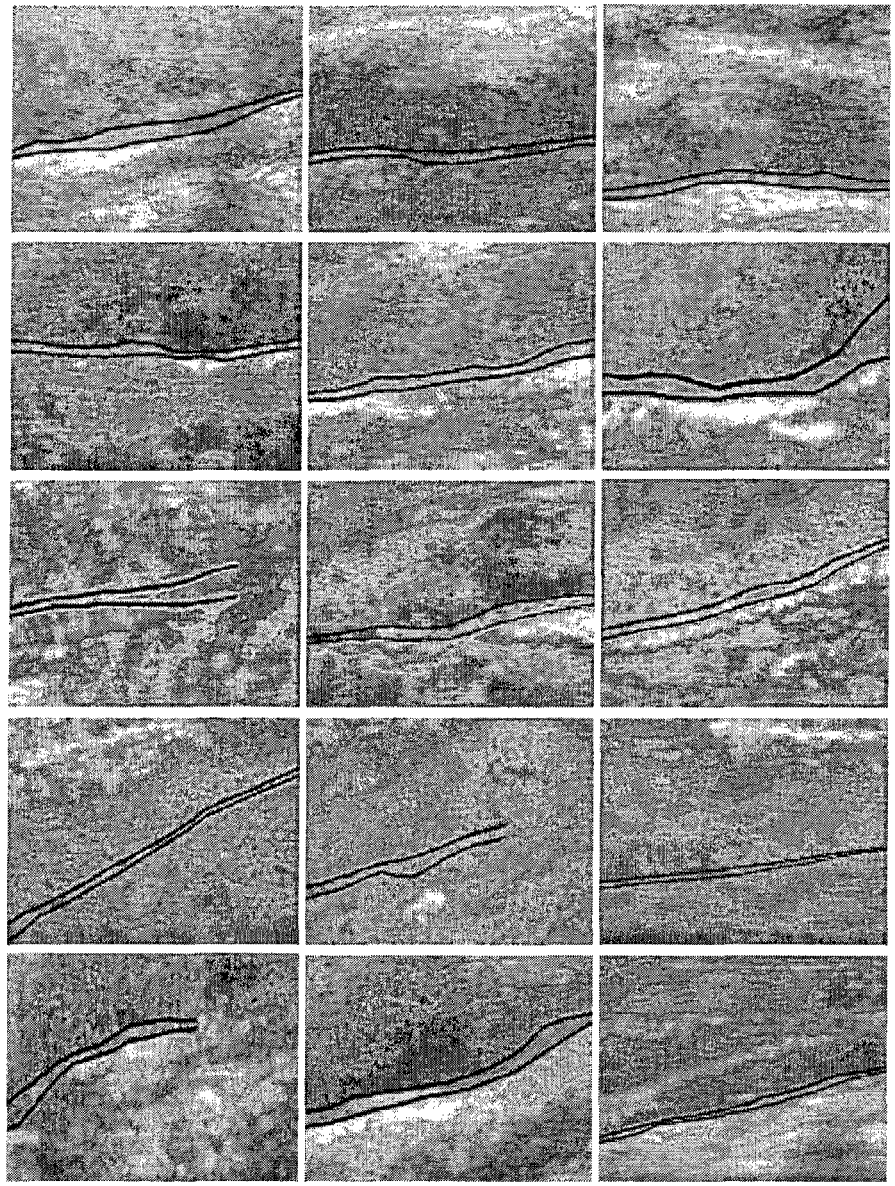
FIG. 10 illustrates segmentation of the first frame of 15 time-sequences of ultrasound images of different internal proximal carotid arteries according to Example 1 of the first embodiment of the method of FIG. 2.

Again, the two versions of the proposed method (MGD and MED) were tested on the 30 video sequences. FIGS. 9 and 10 show the segmentations of the intima-media thickness on the first frame for the 30 video sequences, using the mixture of Nakagami distributions (MND) model as estimated by the EM algorithm. Using the evaluation method of this example, a detailed analysis of the empirical results is presented in Tables V and VI.

Table V presents analysis for the 15 video sequences of the common carotid artery, whereas Table VI presents a similar analysis for the internal proximal carotid artery. Row 1 compares the two experts upon presenting the distance $D_{i,1,2}$ and its standard deviation. Rows 2 and 3 present an analysis of the results for the MGD model estimated by the EM algorithm; more precisely, row 2 compares the segmentation method with the first expert (distance $D_{i,0,1}$ and standard deviation); the p-value of the one-sided difference t-test, for the comparison of the segmentations obtained by the proposed method with the manual segmentations of expert 1, is indicated in parenthesis. Row 3 concerns the second expert (the distance is now denoted $D_{i,0,2}$). Rows 4 and 5 concern the MED model, as estimated by the EM algorithm. Finally, columns 1 to 4 use, respectively, the average distance for the interface lumen-intima, the Hausdorff distance for the same interface, the average distance for the interface media-adventitia, and the Hausdorff distance for that same interface.

The results of the goodness-of-fit tests indicate that the simpler MED model is less adequate than the proposed MGD model. This is explained by the fact that the Rayleigh distribution covers only the case of a high density of random scatterers. In particular, Table IV indicates that the distribution is most often pre-Rician (low density of scatterers) and sometimes generalized Rician lumen distribution is practically Rayleigh (high density of random scatterers, i.e. k=1), the adventitia (coherent components with spacing larger than the pulse width), and the intima-media distribution is on average Rician (coherent components with spacing smaller than the pulse width) but presents the greatest variability in shape among the three distributions.

TABLE V

Comparison of the segmentations obtained by the method of the first embodiment using mixtures of gamma distributions (MGD) or mixtures of exponential distributions (MED), with the manual segmentations performed by two experts for 15 video sequences of the common carotid artery.

| Common carotid | lum.-int. (mean dist.) | lum.-int. (Hausd. dist.) | med.-adv. (mean dist.) | med.-adv. (Hausd. dist.) |
| --- | --- | --- | --- | --- |
| Exp. 1 vs Exp. 2 | 0.22 ± 0.11 mm | 0.48 ± 0.29 mm | 0.15 ± 0.05 mm | 0.38 ± 0.18 mm |
| Exp. 1 vs MGD | 0.21 ± 0.13 mm (0.87) | 0.46 ± 0.21 mm (0.45) | 0.16 ± 0.07 mm (0.27) | 0.41 ± 0.18 mm (0.28) |
| Exp. 2 vs MGD | 0.18 ± 0.11 mm (0.84) | 0.46 ± 0.31 mm (0.47) | 0.15 ± 0.10 mm (0.54) | 0.40 ± 0.31 mm (0.39) |
| Exp. 1 vs MED | 0.21 ± 0.14 mm (0.61) | 0.46 ± 0.25 mm (0.46) | 0.31 ± 0.42 mm (0.075) | 0.76 ± 0.90 mm (0.062) |
| Exp. 2 vs MED | 0.20 ± 0.16 mm (0.62) | 0.49 ± 0.35 mm (0.39) | 0.31 ± 0.47 mm (0.10) | 0.73 ± 0.96 mm (0.090) |

TABLE VI

Comparison of the segmentations obtained by the method of the first embodiment using mixtures of gamma distributions (MGD) or mixtures of exponential distributions (MED), with the manual segmentations performed by two experts for 15 video sequences of the internal proximal carotid artery.

| Internal proximal carotid | lum.-int. (mean dist.) | lum.-int. (Hausd. dist.) | med.-adv. (mean dist.) | med.-adv. (Hausd. dist.) |
| --- | --- | --- | --- | --- |
| Exp. 1 vs Exp. 2 | 0.33 ± 0.17 mm | 0.73 ± 0.33 mm | 0.40 ± 0.29 mm | 0.38 ± 0.67 mm |
| Exp. 1 vs MGD | 0.32 ± 0.14 mm (0.60) | 0.83 ± 0.46 mm (0.25) | 0.33 ± 0.23 mm (0.75) | 0.89 ± 0.65 mm (0.48) |
| Exp. 2 vs MGD | 0.32 ± 0.18 mm (0.56) | 0.85 ± 0.48 mm (0.22) | 0.33 ± 0.22 mm (0.76) | 0.82 ± 0.54 mm (0.61) |
| Exp. 1 vs MED | 0.33 ± 0.16 mm (0.49) | 0.86 ± 0.46 mm (0.19) | 0.44 ± 0.32 mm (0.34) | 1.07 ± 0.74 mm (0.23) |
| Exp. 2 vs MED | 0.32 ± 0.18 mm (0.57) | 0.86 ± 0.49 mm (0.20) | 0.37 ± 0.30 mm (0.59) | 0.90 ± 0.65 mm (0.46) |

The results concerning the lumen and the adventitia distributions seem to be in agreement with anatomical information. Namely, in the carotid, the erythrocytes can be viewed as random scatterers in high density; the adventitia is thought to be primarily fibrocellular and is composed of loose connective tissue whose cells can be viewed as random scatterers in low density together with a resolved coherent component. As for the intima-media distribution, the intima is thought to consist of a monolayer of endothelial cells that can be viewed as random scatterers in high density together with an unresolved coherent component, whereas the media is thought to be composed of smooth muscular cells, elastic fibers, and collagen. Thus, the intima-media thickness offers a greater variability in the configuration of its underlying scatterers, hence perhaps explaining the greater variability in its echogenic statistical properties.

Finally, the results of Tables V and VI indicate that the MED model performs less than the MGD, in particular at the interface between the media and the adventitia. For this interpretation, the practitioner's point of view is adopted in that a higher p-value in a hypothesis test gives a higher confidence level in the null hypothesis tested.

Using a significance level of $\alpha=0.05$, one concludes from Tables V and VI that the mean distance between the semi-automatic segmentations obtained by the proposed method (MGD model) and the manual segmentations performed by either expert, is not significantly more than the mean distance between the manual segmentations of the two experts, in the case of disease-free common and internal proximal carotid arteries. These conclusions hold for the model of mixtures of gamma distributions (or equivalently, Nakagami distributions, after a change of variable). Tables V and VI indicate that the p-values are somewhat lower when using the simpler model of mixtures of exponential distributions (MED) (or equivalently, Rayleigh distributions after the same change of variable).

The same conclusions hold for the Hausdorff distance, but the p-values are lower than for the mean distance. Nevertheless, for the common carotid arteries, the distance between the semi-automatic segmentation and either manual segmentation is at most 0.01 mm for the lumen-intima interface (0.03 mm for the media-adventitia) more than the distance between the two manual segmentations (0.45 mm, or 0.38 mm), on average for the lumen-intima interface, or the media-adventitia interface, respectively. For the internal proximal carotid arteries, the distance between the semi-automatic segmentation and either manual segmentation is at most 0.1 mm (0.01 mm) more than the distance between the two manual segmentations (0.73 mm, or 0.88 mm), on average for the lumen-intima interface, or the media-adventitia interface, respectively. For the simpler MED model, the results obtained are worse, as indicated in Tables V and VI.

It appears that there is a greater variability between the two experts in the case of the internal proximal carotid than in the case of the common carotid. In particular, there was a disagreement on the presence of a plaque or not. But then, the semi-automatic segmentations appear to be within that range of variability, especially when using the mean distance and the MGD model. Thus, it can be concluded that the semi-automatic segmentation method is overall no less reliable than the manual segmentations performed by the expert technicians. It can also be concluded that the proposed MGD model is significantly better than the simpler MED model (this statistical test is one of the few ones for which the Bayes factor can be computed directly from the p-value: $B_{0,1}=p/(1-p)$). Thus, in a Bayesian framework, one accepts the null hypothesis if and only if $B_{0,1} \geq 1$, i.e. $p \geq \frac{1}{2}$, when both kinds of decision errors are equally weighted. So in the case of this test, the Bayesian approach (that amounts to using $\alpha=\frac{1}{2}$) is more severe than the frequentist approach (that uses $\alpha=0.05$ for historical reasons). If one prefers to use $\alpha=\frac{1}{2}$, then this conclusion holds only for the mean distance and the MGD model. In any case, the p-values have been reported).

In the examples where the proposed method performed well, the assumptions made on the echogenicity of the tissues were for the most part verified. On the other hand, in the examples where the proposed method did not perform well, the main cause of difficulty, could be that these assumptions were not quite satisfied. However, the analysis presented in Tables V and VI indicates that the proposed method is nevertheless robust to the estimation procedure.

The EM algorithm combined with the segmentation method took 14 hours and 41 minutes (this represents 16484 estimations and 2227 segmentations) for the 30 video sequences. The implementation was in C++ and the tests were run on a 3 GHz Pentium 4 CPU. Although the average computation time is 24 seconds per frame (14 hours and 41 minutes for 2227 frames), computation time can be decreased by using more than one CPU. One to three seconds may be enough to treat one frame, with a multi-thread implementation. In fact, the ten runs of the EM algorithm are applied independently on each vertical strip. Also, in the ES algorithm, each of the 30 particles explores independently a new solution in its neighbourhood. So, in practice, the clinician can continue the patient examination, while the segmentation of the whole sequence is performed within one to four minutes.

In summary, in the sequences of B-mode images tested in this example, the model of mixtures of Nakagami distributions conforms more to the true statistical distributions than the simpler model of mixture of Rayleigh distributions. The parameters of the proposed model can be efficiently and reliably estimated using the EM algorithm. The results achieved by the embodiment of the semi-automated segmentation method of the invention are within the variability of the manual segmentations of two experts in the case of disease-free carotids.

A second embodiment of the method 100 is concerned with plaque formation(s) in or on the wall of a carotid artery. Specifically, the second embodiment allows accurate and semi-automated segmentations of plaques in a sequence of ultrasonic B-mode images of the carotid artery which may allow the computation of various biomechanical and anatomical properties of the carotid wall that are useful to the clinician in order to follow the evolution of the athero-sclerotic disease of this artery. This can be helpful in predicting risks of vascular rupture due to artherosclerotic plaques and aneurysms. The second embodiment of the method 100 also includes the broad method steps 102, 104, 106, 108 and 110 as illustrated in FIG. 2, as well as the additional broad method steps of 112 and 114.

However, the second embodiment differs from the first embodiment in that in step 102, instead of selecting a number of pixels in the boundary to be segmented, here the boundary is initially manually estimated by tracing the contour of the boundary. In the estimation step 108, the weights of the various gamma distributions specific to each tissue (lumen, plaque in the intima with a boundary defined by the media, and adventitia) are estimated in the sense of the Maximum Likelihood (ML) of a mixture model, based on the initial manual estimation of the plaque boundary (or the one in the previous frame), instead of the proportions of the various (hidden) labels corresponding to the gamma distributions appearing in a Maximum Likelihood (ML) classification of the pixels of the first embodiment. No geometric prior on the dimension of the IMT and other vessel layers are required. A further difference is that in the previous embodiment the weight β of a geometric prior was set (arbitrarily) to a fixed value, whereas its value in the second embodiment is estimated in the sense of the Maximum Pseudo-A-Posteriori (MPAP) estimator, which is closely related to a known Maximum Pseudo-Likelihood (MPL) (as described in for example, J. Besag, *The Statistician*, vol. 24(3), pp. 179-195, 1975). Also, the motion field of the carotid wall in the video sequence is estimated from the solutions and the observable data in a previous frames (Learning step) in order to predict new solutions at the current frame (Prediction step). The predicted solutions are integrated directly into the spatio-temporal cohesion prior term of the proposed Bayesian model. The computation of the MAP then allows the refinement of the solution in the current frame (Correction step). Finally, the prior on the mean IMT for healthy subjects is not used in this embodiment, as it does not hold necessarily in the case of plaques.

As before, given a sequence of T RF images, $r_s^{(t)}$ denotes the brightness of the B-mode envelope of the RF signal (i.e. the norm of the Hilbert operator applied to the RF signal) in the t-th frame at pixel s, whereas $I_s^{(t)} = (r_s^{(t)})^2$ is called the intensity. The field $I^{(t)} = (I_s^{(t)})$ is viewed as the observable random field. Let R be a region of interest that includes the plaque in the carotid wall on a longitudinal view, at least 50% of the lumen, and the adventitia, and that is delimited by two curves $\gamma_-^{(t)}$ and $\gamma_+^{(t)}$, with $\gamma_-^{(t)}$ within the lumen, and $\gamma_+^{(t)}$ outside the carotid wall. Also, $\gamma_1^{(t)}$ and $\gamma_2^{(t)}$ represent the interface between the plaque and the lumen or the adventitia, respectively, in the t-th frame. In particular, $\gamma_1^{(t)}$ and $\gamma_2^{(t)}$ satisfy the point-wise relations $\gamma_-^{(t)} \le \gamma_1^{(t)} \le \gamma_2^{(t)} \le \gamma_+^{(t)}$, upon setting the orientation of the axial axis directed from within the artery toward the wall (bottom or top wall) of interest. The pair of curves $\Gamma^{(t)} = (\gamma_1^{(t)}, \gamma_2^{(t)})$ is viewed as a hidden discrete random field. The segmentation problem can then be formulated as the estimation of $\Gamma^{(t)}$, for $1 \le t \le T$, conditional to an initial solution $\Gamma_{man}^{(1)}$ of $\Gamma^{(1)}$, and the sequence $I^{(1)}, I^{(2)}, \ldots, I^{(T)}$.

Figure 11:
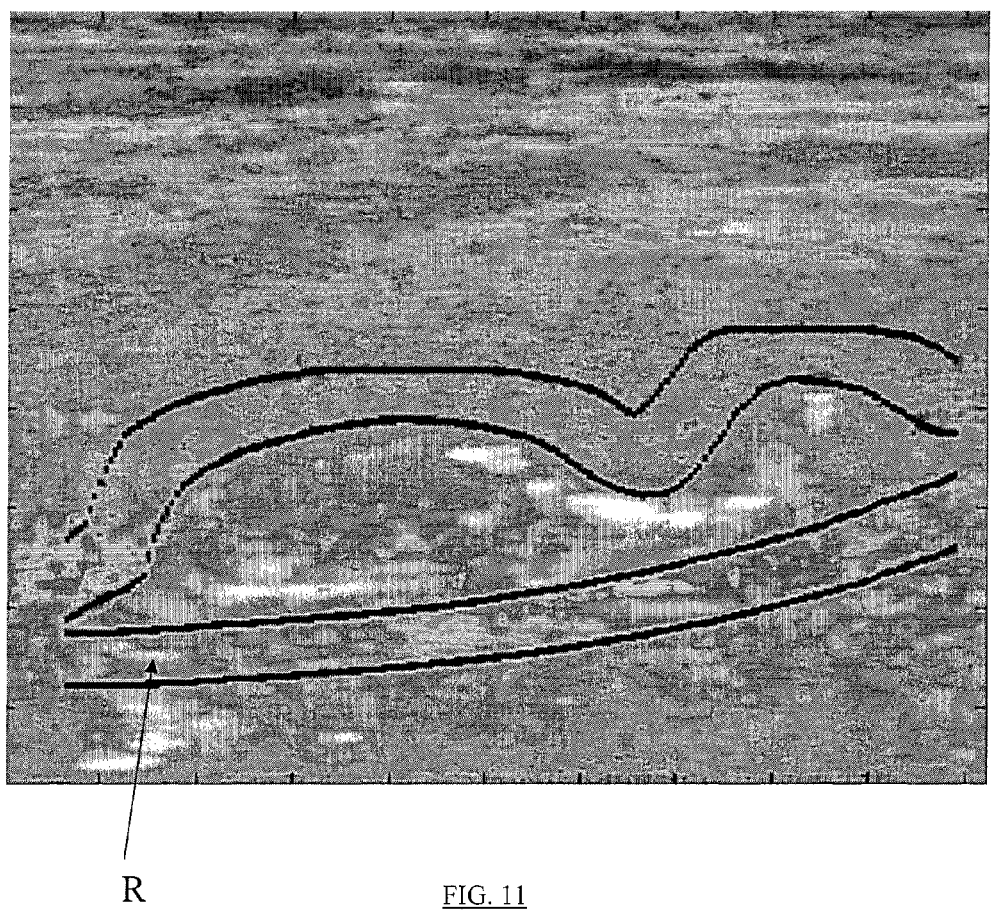
FIG. 11 illustrates an initial boundary estimation step to determine a region on an ultrasound image according to a second embodiment of the method of FIG. 2.

In Step 102, the plaque in the first frame is segmented manually by an operator, thus yielding two piecewise linear curves $\gamma_{1,man}^{(1)}$ and $\gamma_{2,man}^{(1)}$. The hyper-parameter β is estimated (learned) for the whole sequence based on the initial manual segmentation in the sense of the MPAP as will be explained later. Then, two curves $\gamma_-^{(1)}$ and $\gamma_+^{(1)}$ (defining the region R) are obtained by translating $\gamma_{1,man}^{(1)}$ 2 mm toward the lumen and $\gamma_{2,man}^{(1)}$ 2 mm toward the adventitia, respectively (FIG. 11). Alternative distances can be used based on the fact that larger movements of both curves would increase time to convergence of the algorithm.

In Step 104, as before, the region R is divided into non-overlapping vertical strips, b (FIG. 12), but 6 mm wide instead of 3 mm. 800 points between the curves $\gamma_-^{(1)}$ and $\gamma_+^{(1)}$ in each vertical strip b are chosen randomly according to a uniform distribution.

In Step 106, as before, the intensities $I^{(1)}$ of the first frame are modeled by a mixture of three gamma distributions $$\sum_{i=1}^{3} p_{b,i}^{(1)} \mathcal{G}(k_{b,i}^{(1)}, \theta_{b,i}^{(1)}).$$

In Step 108, the mixture of three gamma distributions $$\sum_{i=1}^{3} p_{b,i}^{(1)} \mathcal{G}(k_{b,i}^{(1)}, \theta_{b,i}^{(1)})$$

estimated using the feature $I^{(1)}$ of the first frame at those 800 points, according to the EM algorithm of Table I. Since a prior on the mean IMT for healthy subjects does not apply here, a uniform Dirichlet prior is used on the proportions $p_{b,i}^{(1)}$ specified by the hyper-parameters' values $\alpha_1 = \alpha_2 = \alpha_3 = \frac{1}{3}$, $A_0 = 3$.

Then, the manual initial boundary estimation serves as prediction for the first frame. The values $q_{b,i}^{(1)}$ (i,j=1, 2, 3) are determined from the manual segmentation as will be described below. The distributions $f_j^{(1)}$, for j=1, 2, 3, are constructed for each pixel s in the region of interest, as in equations (55) and (18).

In Step 110, the continuous piecewise linear curves $\hat{\gamma}_1^{(1)}$ and $\hat{\gamma}_2^{(1)}$ located within $\gamma_-^{(1)}$ and $\gamma_+^{(1)}$, that maximize the posterior distribution of a Bayesian segmentation model are computed using the stochastic optimization algorithm Exploration/Selection (ES) of Table IX.

These and other steps of the second embodiment of the method 100 will be described in further detail below together with the formalism underlying this embodiment of the method.

Known models for tracking an object (i.e. time-varying ultrasound sequence in the case of this second embodiment) include a first order Markov model specified by the following probability distributions $$P(\Gamma^{(1)} | \Gamma_{man}^{(1)});$$

$$P(\Gamma^{(t)} | \Gamma^{(t-1)}), t > 1;$$

$$P(I^{(t)} | \Gamma^{(t)}), t \ge 1. \quad (34)$$

One then estimates $\Gamma^{(t)}$ for each frame t, based on a simulation of the posterior probability $P(\Gamma^{(t)} | \Gamma_{man}^{(1)}, I^{(1)}, \ldots, I^{(t)})$. For instance, one might choose the Maximum A Posteriori (MAP) estimator $$\hat{\Gamma}^{(t)} = \arg \max_{\Gamma} P(\Gamma^{(t)} | \Gamma_{man}^{(1)}, I^{(1)}, \ldots, I^{(t)}). \quad (35)$$

One could also choose a sequence of MAP estimators $$\hat{\Gamma}^{(1)} = \arg \max_{\Gamma} P(\Gamma^{(1)} | \Gamma_{man}^{(1)}, I^{(1)}); \quad (36)$$

$$\hat{\Gamma}^{(t)} = \arg \max_{\Gamma} P(\Gamma^{(t)} | \hat{\Gamma}^{(t-1)}, I^{(t)}), \quad t > 1,$$

In this embodiment, rather than the standard first order Markov model, the following sequence of MAP estimators are proposed $$\hat{\Gamma}^{(1)} = \arg \max_{\Gamma} P(\Gamma^{(1)} | \Gamma_{man}^{(1)}, I^{(1)}); \quad (37)$$

$$\hat{\Gamma}^{(t)} = \arg \max_{\Gamma} P(\Gamma^{(t)} | \hat{\Gamma}^{(1)}, \ldots, \hat{\Gamma}^{(t-1)}, I^{(t)}), t > 1,$$

More precisely, given a solution $\Gamma^{(t)}$ at frame t, an affine motion field $d^{(t)}$ is computed based on the observable random field up to frame t+1, (namely $I^{(t)}$ and $I^{(t-1)}$, except at the boundaries). The motion field applied to the solution yields the propagation of the solution at frame t+1. Given τ<t, one can use a recursive estimation of the motion fields $d^{(\tau)}, \ldots, d^{(t-1)}$ to compute the propagation $D^{\tau \to t} \cdot \Gamma^{(\tau)}$ of a solution $\Gamma^{(\tau)}$ up to frame t. One can design a prediction $\Gamma_{pred}^{(t)} = \Phi(D^{1 \to t} \cdot \Gamma^{(1)}, \ldots, D^{(t-1) \to t} \cdot \Gamma^{(t-1)})$, as a weighted sum of the various propagations (viewed as predictive models). In the classical case, one would simply take $\Gamma_{pred}^{(t)} = \Gamma^{(t-1)}$. Then, the proposed model is specified by distributions of the form $$P(\Gamma^{(1)}|\Gamma_{man}^{(1)});$$

$$P(\Gamma^{(t)}|\Gamma_{pred}^{(t)}), \Gamma_{pred}^{(t)} = \Phi(D^{1 \to t} \cdot \Gamma^{(1)}, \ldots, D^{(t-1) \to t} \cdot \Gamma^{(t-1)}), t>1;$$

$$P(I^{(t)}|\Gamma^{(t)}), t \geq 1. \tag{38}$$

The second equation (the transition probability) expresses the probability of the position and shape of the plaque in the t-th frame conditional to the prediction based on the segmentations already performed in the preceding frames, as well as the estimated motion field determined from these solutions and the observed data in the first t frames. The third equation (the sensor distribution) expresses the likelihood of the observable data at frame t conditional to the current position and shape of the plaque.

Since the prediction depends on the observable data (for the estimation of the motion field), the second equation does not define a prior on $\Gamma^{(t)}$, and the terminology of a pseudo-prior is used. Therefore, the third equation does not define a likelihood, and instead the terminology of pseudo-likelihood is used.

The posterior distributions appearing in equation (37) are then expressed as $$P(\Gamma^{(1)}|\Gamma_{man}^{(1)},I^{(1)}) \propto P(\Gamma^{(1)}|\Gamma_{man}^{(1)})P(I^{(1)}|\Gamma^{(1)});$$

$$P(\Gamma^{(t)}|\hat{\Gamma}^{(1)}, \ldots, \hat{\Gamma}^{(t-1)},I^{(1)}, \ldots, I^{(t)}) = P(\Gamma^{(t)}|\hat{\Gamma}_{pred}^{(t)},I^{(t)})$$
$$\propto P(\Gamma^{(t)}|\hat{\Gamma}_{pred}^{(t)})P(I^{(t)}|\Gamma^{(t)}),$$

$$\hat{\Gamma}_{pred}^{(t)} = \Phi(D^{1 \to t} \cdot \hat{\Gamma}^{(1)}, \ldots, D^{(t-1) \to t} \cdot \hat{\Gamma}^{(t-1)}), t>1. \tag{39}$$

Let t be the current frame, and assume that the solutions $\hat{\Gamma}^{(1)}, \ldots, \hat{\Gamma}^{(t-1)}$ in the previous frames have been estimated. Corresponding to these solutions, the appropriate motion fields can be evaluated (learned) for each of the past frames τ<t. Moreover, the statistical distribution of the random field $I^{(t)}$ appearing in equation (39) can be estimated (learned) at the current frame. Then, these estimations are used to predict the current position and shape of the plaque at the current frame t, as well as its appearance. Finally, finding the maximum of equation (39) corrects the predicted solution, thus yielding the solution $\hat{\Gamma}^{(t)}$ at the current frame.

For learning and predicting the position and shape of the plaque, the following first order tissue dynamics (motion vector field) is adopted in a longitudinal view of the plaque:

$$\begin{pmatrix} dx \\ dy \end{pmatrix}(x, y) = \begin{pmatrix} \tau_x \\ \tau_y \end{pmatrix} + \begin{pmatrix} \delta_{11} & \delta_{12} \\ \delta_{21} & \delta_{22} \end{pmatrix}\begin{pmatrix} x \\ y \end{pmatrix}. \tag{40}$$

This is in the context where one may assume the conservation of the B-mode image brightness from one frame to the next:

$$r(x(t),y(t),t) = r(x(1),y(1),1), t \geq 1,$$

which yields the well-known identity of optical flow $$\frac{\partial}{\partial x}r(x(t), y(t), t)dx(x(t), y(t)) + \tag{41}$$
$$\frac{\partial}{\partial y}r(x(t), y(t), t)dy(x(t), y(t)) = -\frac{\partial}{\partial t}r(x(t), y(t), t).$$

Given a segmentation $\Gamma^{(t)}$ of the plaque at the t-th frame, each pixel s=(x,y) in the interior of $\Gamma^{(t)}$ gives rise to an equation:

$$\frac{\partial}{\partial x}r(x, y, t)(\tau_x + \delta_{11}x + \delta_{12}y) + \tag{42}$$
$$\frac{\partial}{\partial y}r(x, y, t)(\tau_y + \delta_{21}x + \delta_{22}y) = -\frac{\partial}{\partial t}r(x, y, t),$$

where $r(x,y,t) = r_s^{(t)}$. The motion field $d^{(t)}$ is then estimated in the sense of the least mean square.

For the computation of the partial derivatives, a uniform low-pass spatial filter is first applied of size 13×5 pixels to the B mode image (the size of the filter can vary and this choice of the size of the filter corresponds to a resolution cell: the axial resolution is equal to ½×λ=½×0.1540=0.23 mm (where λ=0.1540 mm/sec is the transducer wavelength in soft tissues), i.e. 12 pixels; the lateral resolution is equal to λ×F/D= (0.1540×15)/38=0.61 mm (where F=15 mm is the focal distance of the transducer and D=38 mm is the transducer diameter), i.e. 4 pixels), resulting in an image $\bar{r}(x,y,t)$. The following second order approximations are then used:

$$\frac{\partial}{\partial x}r(x, y, t) \approx \frac{1}{8}(\bar{r}(x+1, y-1, t-1) - \bar{r}(x-1, y-1, t-1) + \tag{43}$$
$$\bar{r}(x+1, y+1, t-1) - \bar{r}(x-1, y+1, t-1)$$
$$\bar{r}(x+1, y-1, t+1) - \bar{r}(x-1, y-1, t+1) +$$
$$\bar{r}(x+1, y+1, t+1) - \bar{r}(x-1, y+1, t+1)),$$

and similarly for $$\frac{\partial}{\partial y}r(x, y, t) \text{ and } \frac{\partial}{\partial t}r(x, y, t).$$

At the boundaries (i.e., t=1 or t=T, etc.), the appropriate first order approximations are used. In particular, the motion field d(t) can be learned on a solution $\Gamma^{(t)}$, based on the observable field up to $r^{(t+1)}$.

For predicting the position and shape of the plaque, the following is applied. Given τ<t and a solution $\Gamma^{(t)}$ at frame t, the motion fields $d^{(\tau)}, \ldots, d^{(t-1)}$ can be learned recursively, thus yielding the propagation $$D^{\tau \to t} \cdot \Gamma^{(\tau)} = d^{(t-1)} \circ \ldots \circ d^{(\tau)} \cdot \Gamma^{(\tau)}. \tag{44}$$

Of course, here $d^{(\tau)}$ is learned on $\Gamma^{(\tau)}$, then $d^{(\tau+1)}$ is learned on $d^{(\tau)} \cdot \Gamma^{(\tau)}$, and so on.

If t>1, let $t_0 \leq t_1 \in [1, t-1]$. For each $\tau \in [t_0, t_1]$, let $\Gamma^{(\tau)}$ be a solution at frame τ. For more robustness, we consider the average of the propagations on the time-span $[t_0, t_1]$. Thus, we have $$\Gamma_{pred}^{(t)} = \Phi(\mathcal{D}^{1 \to t} \cdot \Gamma^{(1)}, \ldots, \mathcal{D}^{(t-1) \to t} \cdot \Gamma^{(t-1)}) = \sum_{\tau=t_0}^{t_1} \alpha_{model}^{\tau \to t} \mathcal{D}^{\tau \to t} \cdot \Gamma^{(\tau)}, \quad (45)$$
$$t > 1,$$

where $\alpha_{model}^{\tau \to t} \in [0,1]$ is the weight of each of the predictive models, and $$\sum_{\tau=t_0}^{t_1} \alpha_{model}^{\tau \to t} = 1.$$

In our tests, we chose $t_0 = \max(t-21, 1)$ and $t_1 = t-1$. The model weight is chosen as $$\alpha_{model}^{\tau \to t} \propto 1 - \frac{|\mathcal{D}^{\tau \to (t-1)} \cdot \Gamma^{(\tau)} \Delta \Gamma^{(t-1)}|}{A(\gamma_-^{(t-1)}, \gamma_+^{(t-1)})}, \quad (46)$$

for $t_0 \le \tau \le t_1 = t-1$, where $\Delta$ denotes the usual difference of two sets (i.e., $A \Delta B = \{x: x \text{ is in } A \text{ but not in } B, \text{ or } x \text{ is in } B \text{ but not in } A\}$), and $A(\gamma_-^{(t-1)}, \gamma_+^{(t-1)})$ is the area of the region delimited by the two curves $\gamma_1^{(t-1)}$ and $\gamma_2^{(t-1)}$. In other words, the weight of each predictive model $D^{\tau \to t} \cdot \Gamma^{(\tau)}$ is estimated as the classification success of $D^{\tau \to (t-1)} \cdot \Gamma^{(\tau)}$ when compared with the estimated solution $\Gamma^{(t-1)}$. The weighted sum of the individual predictive models corresponds to a Bayesian model averaging. One considers a weighted sum of classifiers rather than the best one, since the former performs way better than the latter.

Although quite simple, an affine motion field is adequate, provided that the frame rate is high enough, since the pseudo-likelihood $P(I^{(t)}|\Gamma^{(t)})$ allow the solution $\Gamma^{(t)}$ to adapt to the new shape of the deformable plaque at frame t, despite the fact that the prediction $\Gamma_{pred}^{(t)}$ is based only on affine motion fields applied to previous shapes of the plaque.

For the estimation Step 108, three constraints that regularize the segmentation process are considered.

1) Geometrical Smoothness Constraint

Let $\gamma$ be a continuous piecewise linear curve of the form $(x_1, y_1), \ldots, (x_L, y_L)$, where the first coordinate indicates the lateral position and the second component indicates the axial position. In order to take into account the different scaling along the axial and lateral directions between frames, the ratio $\rho = 51.9/6.7$ (1 pixel in the lateral direction corresponds to $\rho = 7.7$ pixels in the axial direction) is considered. A geometrical smoothing constraint is then defined by the normalized geometrical energy (or action) of the curve $\gamma(t) = (x(t), y(t))$ $$\Delta_{sm,D}(\gamma) = \sum_{l=2}^{L} \frac{\rho}{2} \left( \begin{array}{c} Var_{l-1,D}\left(\frac{\rho \dot{x}}{\|\dot{\gamma}\|_\rho}\right) + \\ Var_{l,D}\left(\frac{\rho \dot{x}}{\|\dot{\gamma}\|_\rho}\right) \end{array} \right) \|(x_l - x_{l-1}, y_l - y_{l-1})\|_\rho + \quad (47)$$
$$\sum_{l=2}^{L} \frac{\rho}{2} \left( \begin{array}{c} Var_{l-1,D}\left(\frac{\dot{y}}{\|\dot{\gamma}\|_\rho}\right) + \\ Var_{l,D}\left(\frac{\dot{y}}{\|\dot{\gamma}\|_\rho}\right) \end{array} \right) \|(x_l - x_{l-1}, y_l - y_{l-1})\|_\rho$$

-continued
$$\approx \rho \int \left( \begin{array}{c} Var_{t,D}\left(\frac{\rho \dot{x}}{\|\dot{\gamma}\|_\rho}\right) + \\ Var_{t,D}\left(\frac{\dot{y}}{\|\dot{\gamma}\|_\rho}\right) \end{array} \right) \|\dot{\gamma}(t)\|_\rho dt,$$

where $\|(x, y)\|_\rho = \sqrt{\rho^2 x^2 + y^2}$ and $Var_{t,D}(f)$ denotes the variance of a function $f$ over the portion of the curve $\gamma$ that is restricted to the interval $[a, b]$, with $a < t < b$ such that $$\int_a^t \|\dot{\gamma}(\tau)\|_\rho d\tau = D = \int_t^b \|\dot{\gamma}(\tau)\|_\rho d\tau.$$

Explicitly, $$Var_{t,D}(f) = \frac{\int_a^b \{f(t) - \bar{f}\}^2 \|\dot{\gamma}(\tau)\|_\rho d\tau}{\int_a^b \|\dot{\gamma}(\tau)\|_\rho d\tau},$$

where $$\bar{f} = \frac{\int_a^b f(t) \|\dot{\gamma}(\tau)\|_\rho d\tau}{\int_a^b \|\dot{\gamma}(\tau)\|_\rho d\tau}.$$

In the previous embodiment, D covered the entire curve, since in the absence of pathologies, an overall rectilinear shape of the IMT is expected. Here, we set $D = 5\rho$ (i.e., the equivalent of 5 pixels in the lateral direction), thus allowing a greater variability in the shape of the plaque, since the constraint is more local. Other combinations of parameters to be adjusted according to the ultrasound data base to be segmented are also valid according to the second embodiment of the invention.

2) Spatio-Temporal Cohesion Constraint

Let $\Gamma_{pred}^{(t)} = (\gamma_{1,pred}^{(t)}, \gamma_{2,pred}^{(t)})$ be a predicted solution and $\Gamma = (\gamma_1, \gamma_2)$ be a pair of curves. A spatio-temporal cohesion constraint at frame t encourages the curve $\gamma_i$ to be near $\gamma_{i,pred}^{(t)}$. Namely, given two curves $\gamma = (x_1, y_1), \ldots, (x_L, y_L)$ and $\gamma' = (x'_1, y'_1), \ldots, (x'_L, y'_L)$, we define the distance $$\Delta_{tm}(\gamma, \gamma') = \frac{1}{2\sigma_p^2} \sum_{l=2}^{L} \frac{1}{2} \left( \begin{array}{c} \|(x_l - x'_l, y_l - y'_l)\|_\rho^2 + \\ \|(x_{l-1} - x'_{l-1}, y_{l-1} - y'_{l-1})\|_\rho^2 \end{array} \right) \times \quad (48)$$
$$\frac{1}{2} \left( \begin{array}{c} \|(x_l - x_{l-1}, y_l - y_{l-1})\|_\rho + \\ \|(x'_l - x'_{l-1}, y'_l - y'_{l-1})\|_\rho \end{array} \right)$$
$$\approx \frac{1}{2\sigma_p^2} \int \|\gamma(t) - \gamma'(t)\|_\rho^2 \frac{1}{2} \left( \begin{array}{c} \|\dot{\gamma}(t)\|_\rho + \\ \|\dot{\gamma}'(t)\|_\rho \end{array} \right) dt,$$

where the standard-deviation is taken (somewhat arbitrarily) equal to $\sigma_p = 0.1208$ mm. Other combinations of parameters to be adjusted according to the ultrasound data base to be segmented are also applicable to this embodiment.

3) Overall Prediction Constraint

Given the propagation at frame t $D^{1 \to t} \cdot \Gamma_{man}^{(1)} = (\tilde{\gamma}_1^{(t)}, \tilde{\gamma}_2^{(t)})$ of the initial manual segmentation, two curves $\gamma_-^{(t)}$ and $\gamma_+^{(t)}$ are obtained by translating $\gamma_1^{(t)}$ 2 mm toward the lumen, and $\gamma_2^{(t)}$ 2 mm toward the adventitia, respectively. We consider the hard constraint $$\gamma_-^{(t)} \le \gamma_i^{(t)} \le \gamma_+^{(t)}, i = 1, 2, \quad (49)$$

for each frame $t \geq 1$. Other combinations of parameters to be adjusted according to the ultrasound data base to be segmented are also applicable to this embodiment.

Altogether, combining the three constraints above, the first two distributions of equation (38) are defined by $$P(\Gamma^{(1)} | \Gamma_{man}^{(1)}) \propto \begin{cases} \prod_{i=1}^{2} \exp\left(\dfrac{-\beta \Delta_{sm,D}(\gamma_i^{(1)}) -}{\Delta_{tm}(\gamma_i^{(1)}, \gamma_{i,man}^{(1)})}\right), & \text{if (49) holds;} \\ 0, & \text{otherwise;} \end{cases} \quad (50)$$

$$P(\Gamma^{(t)} | \Gamma_{pred}^{(t)}) \propto \begin{cases} \prod_{i=1}^{2} \exp\left(\dfrac{-\beta \Delta_{sm,D}(\gamma_i^{(t)}) -}{\Delta_{tm}(\gamma_i^{(t)}, \gamma_{i,pred}^{(t)})}\right), & \text{if (49) holds;} \\ 0, & \text{otherwise;} \end{cases} \quad t > 1,$$

where $\beta > 0$ is the weight of the geometrical smoothing constraints. In the previous embodiment, the value of $\beta$ was fixed to 2 throughout the tests. In this second embodiment, its value, is estimated based on the manual segmentation, in the sense of the Maximum Pseudo-A-Posteriori estimator. This is shown in Table VII.

TABLE VII

An example of estimating $\beta$ based on the manual segmentation, in the sense of the Maximum Pseudo-A-Posteriori estimator The geometrical smoothness constraint of equation (47) corresponds to the likelihood of the following Markov point process:

$$P((\gamma_1, \gamma_2) | \beta) = \frac{\exp(-\beta \{\Delta_{sm,D}(\gamma_1) + \Delta_{sm,D}(\gamma_2)\})}{\int\int_{(\gamma_1,\gamma_2)} \exp(-\beta \{\Delta_{sm,D}(\gamma_1) + \Delta_{sm,D}(\gamma_2)\}) d\gamma_1 d\gamma_2}, \quad (51)$$

if (49) holds, and 0, otherwise, where $\beta > 0$ is the weight of the geometrical smoothing constraint. The denominator is called the partition function and is analytically and numerically intractable, thus making the maximization of (51) as a function of $\beta$ practically impossible. In the art (J. Besag, "Statistical Analysis of Non-Lattice Data", *The Statistician*, vol. 24(3), pp. 179-195, 1975), the pseudo-likelihood of a Markov model is proposed as an alternative to its likelihood:

$$P_{PL}((\gamma_1, \gamma_2) | \beta) = \prod_{l=1}^{L_1} P((x_l, y_l) | (\gamma_1 \setminus (x_l, y_l), \gamma_2), \beta) \times \quad (52)$$

$$\prod_{l=1}^{L_2} P((x_l, y_l) | (\gamma_1, \gamma_2 \setminus (x_l, y_l)), \beta)$$

$$= \prod_{l=1}^{L_1} \frac{\exp(-\beta \{\Delta_{sm,D}(\gamma_1) + \Delta_{sm,D}(\gamma_2)\})}{\int\int \exp(-\beta \{\Delta_{sm,D}(\gamma_1 \setminus (x_l, y_l) \cup (\xi_l, \eta_l)) + \Delta_{sm,D}(\gamma_2)\}) d\xi_l d\eta_l} \times$$

$$\prod_{l=1}^{L_2} \frac{\exp(-\beta \{\Delta_{sm,D}(\gamma_1) + \Delta_{sm,D}(\gamma_2)\})}{\int\int \exp(-\beta \{\Delta_{sm,D}(\gamma_1) + \Delta_{sm,D}(\gamma_2 \setminus (x_l, y_l) \cup (\xi_l, \eta_l))\}) d\xi_l d\eta_l}$$

$$= \prod_{l=1}^{L_1} \frac{\exp(-\beta \Delta_{sm,D}(\gamma_1))}{\int\int \exp(-\beta \Delta_{sm,D}(\gamma_1 \setminus (x_l, y_l) \cup (\xi_l, \eta_l))) d\xi_l d\eta_l} \times$$

$$\prod_{l=1}^{L_2} \frac{\exp(-\beta \Delta_{sm,D}(\gamma_2))}{\int\int \exp(-\beta \Delta_{sm,D}(\gamma_2 \setminus (x_l, y_l) \cup (\xi_l, \eta_l))) d\xi_l d\eta_l}.$$

Taking the logarithmic derivative $\dfrac{d \log}{d \beta} P_{PL}((\gamma_1, \gamma_2) | \beta)$, one obtains $$\sum_{l=1}^{L_1} -\Delta_{sm,D}(\gamma_1) + \frac{\int\int \Delta_{sm,D}(\gamma_1 \setminus (x_l, y_l) \cup (\xi_l, \eta_l)) \exp(-\beta \Delta_{sm,D}(\gamma_1 \setminus (x_l, y_l) \cup (\xi_l, \eta_l))) d\xi_l d\eta_l}{\int\int \exp(-\beta \Delta_{sm,D}(\gamma_1 \setminus (x_1, y_1) \cup (\xi_l, \eta_l))) d\xi_l d\eta_1} + \quad (53)$$

$$\sum_{l=1}^{L_2} -\Delta_{sm,D}(\gamma_2) + \frac{\int\int \Delta_{sm,D}(\gamma_2 \setminus (x_l, y_l) \cup (\xi_l, \eta_l)) \exp(-\beta \Delta_{sm,D}(\gamma_2 \setminus (x_l, y_l) \cup (\xi_l, \eta_l))) d\xi_l d\eta_l}{\int\int \exp(-\beta \Delta_{sm,D}(\gamma_{21} \setminus (x_l, y_l) \cup (\xi_l, \eta_l))) d\xi_l d\eta_l}$$

Note that in the case where $\Delta_{sm,D}(\gamma_1) + \Delta_{sm,D}(\gamma_2) = 0$; the value TABLE VII-continued An example of estimating β based on the manual segmentation, in the
sense of the Maximum Pseudo-A-Posteriori estimator $\frac{d \log}{d\beta} P_{PL}((\gamma_1, \gamma_2) | \beta)$ is positive for any $\beta \geq 0$. In particular, the maximum of the pseudo-likelihood is reached at
infinity. In order to deal with that degenerate case, we find convenient (as will appear clear
below) to consider a prior on the hyper-parameter $\beta$ of the form $P(\beta) = \mathcal{G}(\beta | k, \theta)$, with
$k > 1$ and $\theta > 0$. Indeed, we compute $\frac{d \log}{d\beta} P(\beta) = (k-1)/\beta - 1/\theta$; thus, $\lim_{\beta \to 0} \frac{d \log}{d\beta} P(\beta) = \infty$ and $\lim_{\beta \to \infty} \frac{d \log}{d\beta} P(\beta) = -1/\theta < 0$.

$\lim_{\beta \to \infty} \frac{d \log}{d\beta} P(\beta) = -1/\theta < 0$. But also $\lim_{\beta \to 0} \frac{d \log}{d\beta} P_{PL}((\gamma_1, \gamma_2) | \beta)$ is a (finite)

real number, and $\lim_{\beta \to \infty} \frac{d \log}{d\beta} P_{PL}((\gamma_1, \gamma_2) | \beta)$ is equal to (54)

$\sum_{l=1}^{L_1} -\Delta_{sm,D}(\gamma_1) + \min_{(\xi_l, \eta_l)} \Delta_{sm,D}(\gamma_1 \setminus (x_l, y_l) \cup (\xi_l, \eta_l)) + \sum_{l=1}^{L_2} -\Delta_{sm,D}(\gamma_2) + \min_{(\xi_l, \eta_l)} \Delta_{sm,D}(\gamma_2 \setminus (x_l, y_l) \cup (\xi_l, \eta_l))$, which is a non-positive real number, Altogether, one obtains $\lim_{\beta \to 0} \frac{d \log}{d\beta} (P_{PL}((\gamma_1, \gamma_2) | \beta) P(\beta)) = \infty$ and $\lim_{\beta \to \infty} \frac{d \log}{d\beta} (P_{PL}((\gamma_1, \gamma_2) | \beta) P(\beta)) < 0$.

It follows from the intermediate theorem for continuous functions, that $\frac{d \log}{d\beta} (P_{PL}((\gamma_1, \gamma_2) | \beta) P(\beta)) = 0$ for some $\hat{\beta} \in (0, \infty)$. Finally, one can easily check that the function $\frac{d \log}{d\beta} (P_{PL}((\gamma_1, \gamma_2) | \beta) P(\beta))$ is decreasing on $(0, \infty)$. Therefore, the solution $\hat{\beta}$ is unique; it is called the Maximum pseudo-A-
Posteriori (MPAP).
In this embodiment, we took systematically $k = 2$ and $\theta = 1$, so that the distribution $P(\beta)$ has mean
$k\theta = 2$ and variance $k\theta^2 = 2$. The median is around 1.68; the 2.5% percentile is 0.24, whereas the
97.5% is 5.57. This prior is informative. The estimated values of $\beta$ varied between 0.2 and 10,
and hence, that estimation is worthwhile.

As in the previous embodiment, in order to take into account the lateral echogenicity variations of tissues in longitudinal images of the carotid arteries, the region R is partitioned into B vertical strips. At frame t, the distribution of the intensity $I_s$ at each pixel in the strip b is modeled by a mixture of three gamma distributions $\sum_{i=1}^{3} p_{b,i}^{(t)} \mathcal{G}(I_s | k_{b,i}^{(t)}, \theta_{b,i}^{(t)})$, as in equation (14).

Equivalently, $r = \sqrt{I}$ is distributed according to a mixture of three Nakagami distributions (c.f. equation (2)). As before, more or less than three statistical distributions can be used depending on the body being imaged and the complexity of the image texture brightness.

In Step 108, the mixture of gamma distributions is estimated (learned) using the EM algorithm of Table I. As before, the distributions are ordered by increasing value of the means $k_{b,i}^{(t)} \theta_{b,i}^{(t)}$ of I.

Each component of the region R (in this case the lumen, the plaque and the adventitia) is characterized by a mixture of the three gamma distributions, with proportions specific to the component:

$f_{b,j}^{(t)}(I_s) = \sum_{i=1}^{3} q_{b,i}^{j,(t)} \mathcal{G}(I_s | k_{b,i}^{(t)}, \theta_{b,i}^{(t)})$; (55)

$\sum_{i=1}^{3} q_{b,i}^{j,(t)} = 1, \quad j = 1, 2, 3; \quad q_{b,i}^{j,(t)} \geq 0, \quad i, j = 1, 2, 3$, where j=1, 2, 3 corresponds, respectively, to the lumen, the plaque, and the adventitia. This averaging model is more robust to the variability in intensity within the ultrasound image due to various ultrasonographic phenomena (e.g., non-uniform acoustic gel distribution, acoustic reverberation, attenuation and shadowing, etc). For instance, the adventitia is more likely to present the highest intensity whenever there is no highly echogenic plaque, but the lowest intensity in the opposite case. Equation (55) replaces equations (15), (16), (17) of the first embodiment.

The distribution $f_i^{(t)}(I_s^{(t)})$ at each pixel of the region of interest is defined as in equation (18). Here, however, the vertical strips are 6 mm wide (instead of 3 mm).

The distributions are predicted as follows. If t>1, let $\Gamma_{pred}^{(t)}$ be the predicted solution at frame t. For each component j=1, 2, 3 (i.e. lumen, plaque, or adventitia) and each window b, the three coefficients $q_{b,i}^{j,(t)}$, I=1, 2, 3, in equation (55) are estimated in the sense of the Maximum Likelihood (ML) criterion. Namely, for each window b and each component j, the coefficients $q_{b,i}^{j,(t)}$, I=1, 2, 3, are chosen to maximize the likelihood $$\prod_{s \in tissue} \left( \sum_{i=1}^{3} q_{b,i}^{j,(t)} \mathcal{G}(I_s^{(t)} | k_{b,i}^{(t)}, \theta_{b,i}^{(t)}) \right). \quad (56)$$

In Step 108, these coefficients can be computed using the EM algorithm of Table VIII.

In that manner, the proportion of each gamma distribution in the mixture of distributions that corresponds to a component is learned from the solutions at the previous frames and the estimation at the current frame.

TABLE VIII

The EM algorithm used for estmating the weight of each gamma distribution, the parameters of the gamma distributions being known, which is an example of an algorithm which can be used in the embodiment of the method of the invention

| | |
|---|---|
| l | number of gamma kernels; |
| $I_1, \ldots, I_N$ | independent and identically-distributed (i.i.d.) samples of the mixture of gamma distributions; |
| $c_1, \ldots, c_N$ | the latent kernel variables; |
| $p_i$ | proportion of the i-th kernel; |
| $k_i, \theta_i$ | parameters of the i-th kernel; |
| $A_o, \alpha_1, \ldots, \alpha_l$ | parameters for the prior on $p_1, \ldots, p_l$. |

Goal: to compute the Maximum A Posteriori estimator of equation (7) conditional to $I_1, \ldots, I_N$ (with at least two distinct elements).
for j = 1, . . . , N do
 Draw $c_j$ = i with probability $\omega_i$ = 1/l.
end for
for i = 1, . . . , l do
 Set $$p_i = \frac{N_i + A_o \alpha_i - 1}{N + A_o - 1},$$

where $N_i$ is the number of labels $c_j$ equal to i.
Let $k_i, \theta_I$ be the Maximum Likelihood estimator of the gamma distribution on the sample $\{I_j: c_j = i\}$.
end for
repeat
 E-step:
 for j = 1, . . . , N do Set $p(c_j = i) = \dfrac{p_i G(I_j | k_i, \theta_i)}{\sum_{i=1}^{l} p_i G(I_j | k_i, \theta_i)}$, for i = 1, ..., l.

end for
 M-step:
 for i = 1, . . . , l do
  Update

TABLE VIII-continued

The EM algorithm used for estmating the weight of each gamma distribution, the parameters of the gamma distributions being known, which is an example of an algorithm which can be used in the embodiment of the method of the invention $$p_i = \frac{P_i + A_o \alpha_i - 1}{N + A_o - 1}, \text{ where } P_i = \sum_{j=1}^{N} p(c_j = 1).$$

Solve log $$x - \psi(x) = \log \frac{Q_i}{P_i} - \frac{R_i}{P_i},$$

where $\psi(x)$ denotes the digamma function $$\Gamma'(x)/\Gamma(x), Q_i = \sum_{j=1}^{N} I_j p(c_j = i), \text{ and } R_i = \sum_{j=1}^{N} \log I_j p(c_j = i).$$

Note that log x − $\psi(x)$ is a decreasing function on (0, ∞), $\lim_{x \to 0} \log x - \psi(x) = \infty$ and $\lim_{x \to \infty} \log x - \psi(x) = 0$.
Since log $$\frac{Q_i}{P_i} - \frac{R_i}{P_i} > 0,$$

under the assumption that at least two sample elements are distinct, it follows that x can be found by a binary search.
Update $k_i$ = x
Update $$\theta_i = \frac{Q_i}{k_i P_i}.$$

end for
until a stopping criterion is met.

In Step 110, the pseudo-likelihood of the segmentation model is then as follows. Let the pair of curves $\Gamma^{(t)} = (\gamma_1^{(t)}, \gamma_2^{(t)})$ represent the interface between the lumen and the plaque or the plaque and the adventitia, respectively. Using the identification of each tissue to a mixture of distributions as in equation (55), and the averaging of equation (18), the pseudo-likelihood of the segmentation model (i.e., the third distribution of equation (38)) is defined exactly as in equation (20).

The pseudo-prior is as in equation (50). Then, the continuous piecewise linear curves $\hat{\gamma}_1^{(1)}$ and $\hat{\gamma}_2^{(2)}$ located within $\gamma_-^{(1)}$ and $\gamma_+^{(1)}$, that maximize the posterior distribution (c.f. equation (39)) of that Bayesian segmentation model are computed using the stochastic optimization algorithm Exploration/Selection (ES) of Table IX, which is an adaptation of the version of Table III to the case of more flexible shapes of plaques.

Figure 12:
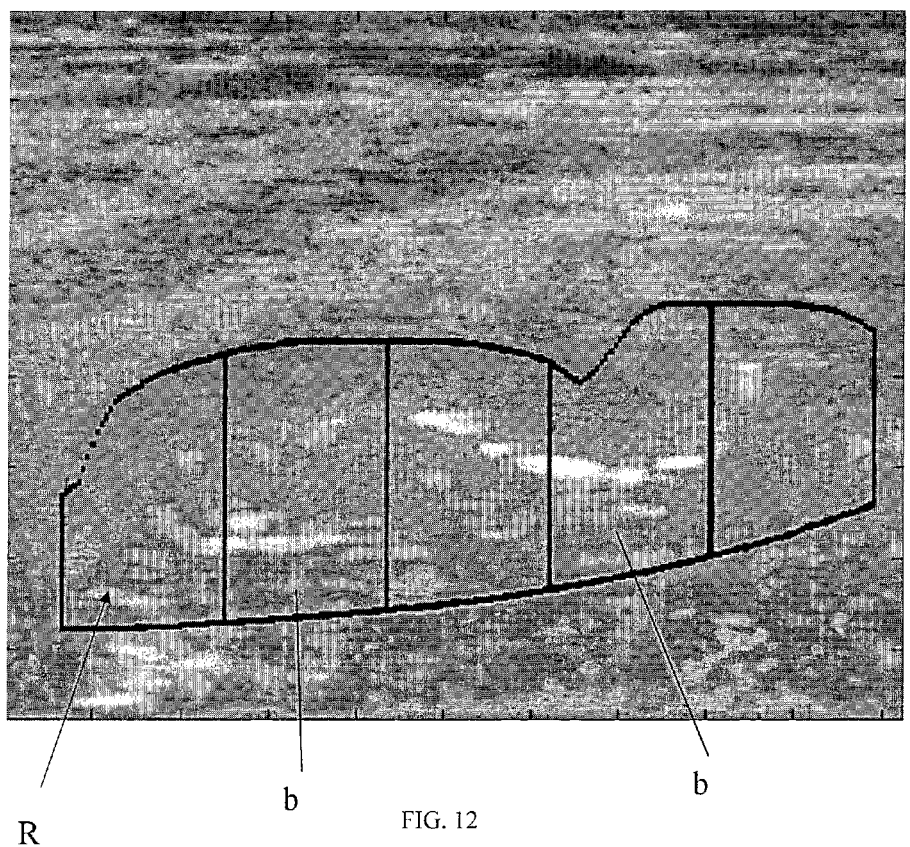
FIG. 12 illustrates the ultrasound image of FIG. 11 in which the region has been divided into non-overlapping windows.
Figure 13A:
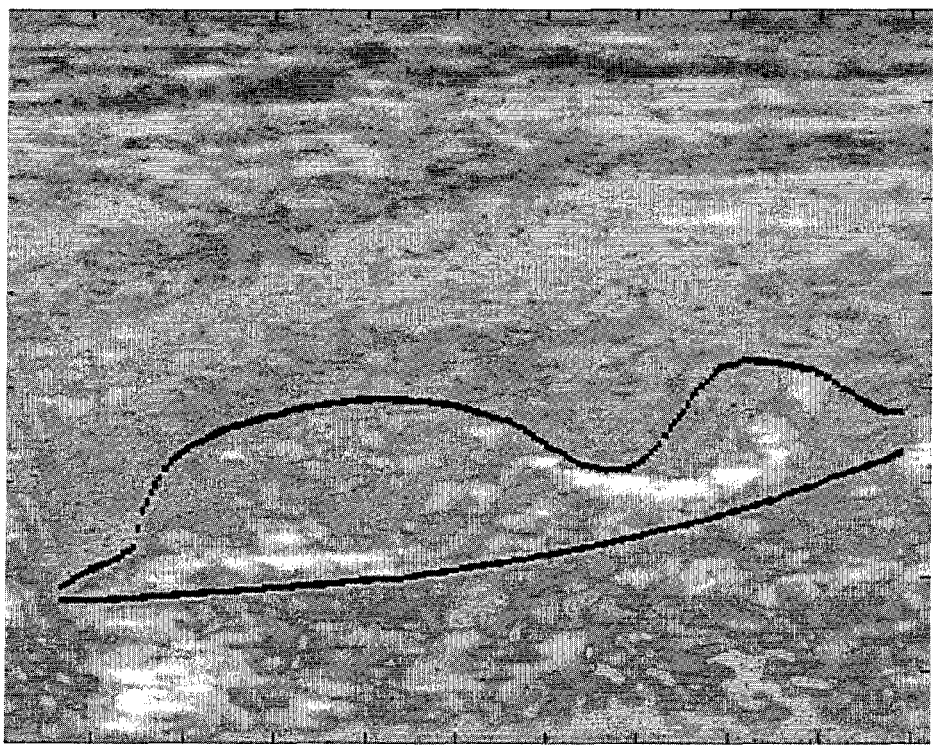
FIGS. 13A and 13B are examples of segmented ultrasound images obtained by the second embodiment of the method of the present invention.
Figure 13B:
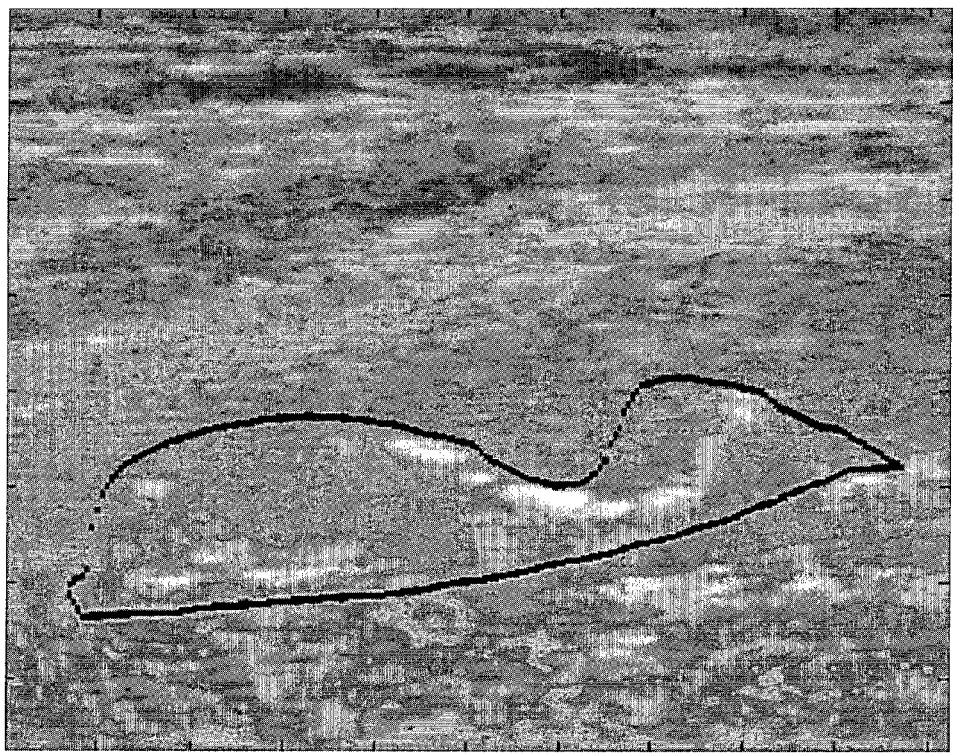

An example of two segmented frames of the sequence, initialized on the first frame in FIG. 12, according to this second embodiment of the method 100 is illustrated in FIGS. 13A and 13B.

It will be appreciated that an image segmented according to an embodiment of the method 100 can then be further manipulated/analyzed to calculate or estimate properties of the segmented components. For example, in the case of arteries the spatio-temporal thickness variability or the elasticity distribution (elastogram) can be calculated. It is also possible to perform ultrasound characterization based on the embodiments of the method of the present invention, i.e. associate a given tissue characteristic to a given mixture of Nakagami distributions e.g. a lipid pool within a plaque formation in a blood vessel wall, a calcified plaque, a fibrous plaque, etc.

According to another aspect of the invention, the method of the embodiments of the invention can be implemented in various forms of hardware software, firmware, special purpose processes, or a combination thereof, such as the CPU of the system of FIG. 1. In one embodiment, the present invention can be implemented in software as an application program embodied on a computer readable program storage device, or in a computer readable memory having recorded thereon statements and instructions for execution by a computer to carry out a method of image segmentation according to the present invention. The computer system also include an operating system and micro instruction code.

TABLE IX

The ES algorithm, which is an example of an algorithm which can be used in this embodiment of the method of the invention

| | |
|---|---|
| $\Gamma = (\gamma_1, \gamma_2)$ | pair of intima-media piecewise linear curves; |
| $L_1, L_2$ | number of control points on $\gamma_1$ and $\gamma_2$, respectively; |
| $F(\Gamma)$ | $-\log P(\Gamma \mid \Gamma_{man}^{(1)}, I^{(1)})$ or |
| | $-\log P(\Gamma \mid \widetilde{\Gamma}^{(1)}, ..., \widetilde{\Gamma}^{(t-1)}, I^{(1)}, ..., I^{(t)})$; |
| n | size of the population (n = 30); |
| i | iteration number; |
| $\vec{\Gamma}^{[i]} = (\Gamma_l^{[i]})$ | population of the pairs of intima-media curves at iteration i, with l = 1,..., n; |
| $p_i = i^{-1/\tau}$ | probability of exploration at iteration i ($\tau$ = 15 in our tests); |
| r | radius of exploration (r = 1/8 in our tests); |
| D = 1/(2r) | diameter of exploration; |

Parameter initialization: Initialize randomly $\Gamma_l^{[0]}$, for l = 1,..., n. Set i = 1.
repeat
    Update i ← i + 1.
    Determine the best current solution $\alpha(\vec{\Gamma}^{[i]}) = \Gamma_l^{[i]}$,
    where $F(\Gamma_k^{[i]}) > F(\Gamma_l^{[i]})$ for
    k < l, and $F(\Gamma_k^{[i]}) \geq F(\Gamma_l^{[i]})$ for k > l.
    for l = 1, 2,..., n do
        Let u be a random number between 0 and 1.
        if u ≤ $p_i = i^{-1/\tau}$ then
            Exploration: Draw j from a binomial distribution
            B(1/(D−1), D−1). Set
            $\Gamma = \Gamma_l^{[i]}$.
            for j + 1 times do
                Replace $\Gamma = (\gamma_1, \gamma_2)$ by $\Gamma' = (\gamma_1', \gamma_2')$ drawn as follows.
                for j = 1,..., $L_1$ do
                      With probability 1/$L_1$, set randomly the j-th control point
                      (c.p.) of $\gamma_1'$ within a radius r × 2 mm of the j-th c.p. of
                      $\gamma_1$, between $\gamma_{-\ and\ \gamma+}$,
                      and within at most 2 mm of the propagation of the initial
                      segmentation at the current frame. Else, the j-th c.p. of $\gamma_1'$ is
                      the same as for $\gamma_1$.
                end for
                Similarly for $\gamma_2'$
            end for
            Set $\Gamma_l^{[i+1]} = \Gamma$.
        else
            Selection: Replace $\Gamma_l^{[i]}$ by $\alpha(\vec{\Gamma}^{[i]})$
        end if
    end for
until a stopping criterion is met This invention is not limited in its application to the details of construction and the arrangement of components set forth in the above description or illustrated in the drawings. The invention is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items.

While several embodiments of the invention have been described herein, it will be understood that the present invention is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention as defined in the appended claims.

For example, instead of the initial estimation of the boundary being performed manually, it can also be an automated or a semi-automated process. The region R can be determined by an alternative translating process such as by translating to different extents and distances. For example if the boundary to be estimated is circular such as that around the periphery of a discrete component within a body, the initial estimation may be translated radially. This could be the case, for example, if ultrasound images are acquired from an intravascular probe positioned within a blood vessel or an endoscope positioned within a cavity. The invention should not be limited to the application described in the embodiments but should encompass all other suitable applications such as the segmentation of any other anatomical structures, for example, the definition of the borders of organs such as the liver, kidneys etc.

Furthermore, the present invention is not limited to ultrasound images but can be applied to other images or image data such as optical image data. Optical image data can be described by color shading with given statistical distributions. For example, embodiments of the method and system of the invention are readily applicable to semi-automatically tracking shapes or silhouettes in video sequences, or other such uses.

It will also be appreciated that the estimation and optimization algorithms described above are not limiting in that other suitable estimation and optimization algorithms can be used without departing from the invention. For example, instead of the ES algorithm, the following can be used: the simulated annealing algorithm (for example as described by Friedland et al in IEEE Trans. Med. Imag., vol. 8, no. 4, pp. 344-353, 1989), the simulated annealing algorithm with a modified Gibbs sampler (for example as described By Francois in IEEE Trans. Evol. Comput., vol. 2, no. 3, pp. 77-90, 1998), the Iterated Conditional Mode (ICM) algorithm (J. Besag, "On the Statistical Analysis of Dirty Pictures", J. R. Statist. Soc. B, vol. 48, no. 3, pp. 259-302, 1986), iterative multigrid dynamic programming in (for example as described by Dias et al in IEEE Trans. Med Imag., vol. 15, no. 1, pp. 25-38, 1996), and a genetic algorithm in (for example as described by Mignotte et al in Pattern Analysis and Applications, vol. 4, pp. 256-271, 2001).

What is claimed is:

1. A method for segmenting an image, the method comprising:
    determining an initial estimation of a boundary between at least two components in a region of an image to be segmented;
    providing image data from the region of the image to be segmented, the image data representing quality values of a plurality of image elements of the at least two components;
    modelling the image data with a mixture of at least two statistical distributions, each statistical distribution having more than one parameter, and each component being associated with certain weights of the at least two statistical distributions in the mixture;
    estimating the parameters of the statistical distributions in the mixture;

for each component, estimating the weights of the at least two statistical distributions in the mixture based on the estimated parameters and the image data of each image element; and optimizing the initial estimation of the boundary between the at least two components based on the estimated parameters and estimated weights.

2. A method according to claim 1, wherein the mixture of the at least two statistical distributions is one of a mixture of Nakagami distributions and Gamma distributions, each Nakagami distribution having two parameters and each Gamma distribution having two parameters.

3. A method according to claim 1, wherein estimating the parameters of the at least two statistical distributions is based on a parameter estimation algorithm.

4. A method according to claim 1, wherein optimizing the initial estimation of the boundary is based on an optimization algorithm.

5. A method according to claim 1, further comprising:
determining the region of the image to be segmented from the initial estimation of the boundary by at least one of manually selecting a plurality of discrete points; and manually tracing the boundary to form the initial boundary.

6. A method according to claim 5, wherein determining the region comprises determining a curve of best fit for the manually selected plurality of discrete points, and transposing the curve of best fit by a first predetermined distance in one direction to form a first border of the region and by transposing the curve by a second predetermined distance in another direction to form a second border of the region.

7. A method according to claim 6, wherein estimating the weights of the at least two statistical distributions in the mixture for each component is based on a predetermined quality level ranking between the at least two distributions.

8. A method according to claim 5, wherein determining the region comprises transposing the initial boundary by a first predetermined distance in one direction to form a first border of the region and by transposing the initial boundary by a second predetermined distance in another direction to form a second border of the region.

9. A method according to claim 8 wherein estimating the weights of the at least two distributions in the mixture for each component is based on the traced boundary.

10. A method according to claim 1, wherein the region comprises at least two non-overlapping sub-regions and the method further comprises smoothing the at least two statistical distributions between each sub-region.

11. A method according to claim 10, wherein smoothing the at least two statistical distributions between each sub-region comprises modelling the image data from each sub-region by a Bayesian model average of the mixture of the at least two statistical distributions corresponding to the at least two sub-regions.

12. A method according to claim 1, wherein the image is a first frame of a sequence of images, the method further comprising providing a second image which is a second frame of the sequence of images, propagating the optimized boundary of the first frame to form an initial boundary estimation in the second frame, and optimizing, at least semi-automatically, the initial boundary estimation in the second frame.

13. A method according to claim 12, wherein propagating the optimized boundary of the first frame comprises one of:
repeating the optimized boundary in the second frame; and
propagating the optimized boundary of the first frame comprises a prediction based on a motion estimation.

14. A method according to claim 1, wherein the at least two components are part of a biological material.

15. A system for segmenting an image, the system comprising:
a display for displaying an image of at least two components having a boundary to be estimated;
a digitizer in communication with the display for providing image data of a region of the image to be segmented based on an initial estimation of the boundary, the image data representing quality level values of a plurality of image elements of the at least two components; and
a processor in communication with the digitizer for:
modelling the image data with a mixture of at least two statistical distributions, each statistical distribution having more than one parameter, and each component being associated with certain weights of the at least two statistical distributions in the mixture;
estimating the parameters of the statistical distributions in the mixture; for each component, estimating the weights of the at least two statistical distributions in the mixture based on the estimated parameters and the image data of each image element; and
optimizing the initial estimation of the boundary between the at least two components based on the estimated parameters and estimated weights.

16. A system according to claim 15, wherein the image is an ultrasound image and the quality levels are gray levels.

17. A system according to claim 16, further comprising an ultrasound system for generating the ultrasound image.

18. A system according to claim 15, wherein the display is arranged to display the optimized boundary on the image.

19. A system according to claim 15, further comprising an input device for manually estimating the boundary on the image.

20. A method according to claim 1, wherein the ultrasound image is a RF ultrasound image and the image data is RF image data representing gray level values, the method comprising converting the RF image data to B-mode data.

* * * * *